(12) United States Patent
Hatano et al.

(10) Patent No.: US 11,372,261 B2
(45) Date of Patent: Jun. 28, 2022

(54) OPTICAL UNIT WITH SHAKE-CORRECTION FUNCTION

(71) Applicant: NIDEC SANKYO CORPORATION, Nagano (JP)

(72) Inventors: Shinji Hatano, Nagano (JP); Shogo Kasahara, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 17/190,414

(22) Filed: Mar. 3, 2021

(65) Prior Publication Data
US 2021/0278688 A1 Sep. 9, 2021

(30) Foreign Application Priority Data
Mar. 4, 2020 (JP) .............................. JP2020-036400

(51) Int. Cl.
G02B 27/64 (2006.01)
H04N 5/225 (2006.01)
G03B 5/02 (2021.01)

(52) U.S. Cl.
CPC .............. *G02B 27/646* (2013.01); *G03B 5/02* (2013.01); *H04N 5/2254* (2013.01); *G03B 2205/0023* (2013.01)

(58) Field of Classification Search
CPC .... G03B 5/02; G03B 5/06; G03B 2205/0007; G03B 2205/0023; H04N 5/2254; G02B 27/646
See application file for complete search history.

(56) References Cited

U.S. PATENT DOCUMENTS 8,089,694 B2 1/2012 Wernersson
8,224,169 B2 7/2012 Tsuruta et al.
(Continued)

FOREIGN PATENT DOCUMENTS

CN 101183203 5/2008
CN 101256333 9/2008
(Continued)

OTHER PUBLICATIONS

"Office Action of China Counterpart Application" with English translation thereof, dated Mar. 1, 2022, p. 1-p. 21.

*Primary Examiner* — Christopher E Mahoney
(74) *Attorney, Agent, or Firm* — JCIPRNET

(57) ABSTRACT

An optical unit with shake-correction function is provided and includes: a movable body, a rotational support structure, a gimbal mechanism, a fixed body, and a rolling corrective-magnet drive structure. The rotational support structure, which supports the movable body to be rotatable around an optical axis, is rotatably supported by the gimbal mechanism around two axes intersecting with the optical axis. The rotational support structure includes a first annular groove provided on the movable body, a plate roller including a second annular groove facing the first annular groove, and multiple spherical objects inserted in the first annular groove and the second annular groove. The gimbal mechanism supports the plate roller to be rotatable. The rolling corrective-magnet drive structure, which rotates the movable body around the optical axis, includes a rolling corrective magnet on the movable body side, and two rolling corrective coils on the fixed body side.

10 Claims, 18 Drawing Sheets

(56) References Cited

U.S. PATENT DOCUMENTS

| | | |
|---|---|---|
| 8,238,736 B2 | 8/2012 | Tsuruta et al. |
| 8,396,357 B2 | 3/2013 | Yanagisawa et al. |
| 9,057,883 B2 | 6/2015 | Yasuda |
| 9,854,172 B2 | 12/2017 | Ezawa et al. |
| 10,509,195 B2 | 12/2019 | Lee |
| 10,649,226 B2 | 5/2020 | Minamisawa et al. |
| 10,747,013 B2 | 8/2020 | Lim |
| 10,782,591 B2 | 9/2020 | Minamisawa |
| 10,948,737 B2 | 3/2021 | Minamisawa et al. |
| 10,976,640 B2 | 4/2021 | Minamisawa et al. |
| 11,137,569 B2 | 10/2021 | Lee |
| 2009/0052037 A1 | 2/2009 | Wernersson |
| 2015/0293372 A1* | 10/2015 | Hamada ............... H04N 5/2254 359/557 |
| 2020/0341291 A1 | 10/2020 | Lim |
| 2021/0041717 A1 | 2/2021 | Takei |
| 2021/0215903 A1* | 7/2021 | Rho ....................... G03B 30/00 |
| 2021/0240000 A1 | 8/2021 | Kasahara et al. |
| 2021/0318592 A1* | 10/2021 | Kim ........................ G02B 7/08 |

FOREIGN PATENT DOCUMENTS

| | | | | |
|---|---|---|---|---|
| CN | 101785296 | 7/2010 | | |
| CN | 102016708 | 4/2011 | | |
| CN | 102016709 | 4/2011 | | |
| CN | 102187273 | 9/2011 | | |
| CN | 104280977 | 1/2015 | | |
| CN | 105278208 | 1/2016 | | |
| CN | 106707454 | 5/2017 | | |
| CN | 108073011 | 5/2018 | | |
| CN | 108156367 | 6/2018 | | |
| CN | 108333791 | 7/2018 | | |
| CN | 108693678 | 10/2018 | | |
| CN | 108693680 | 10/2018 | | |
| CN | 110073286 | 7/2019 | | |
| CN | 211698335 U * | 10/2020 | ............. | F03G 7/065 |
| CN | 112346282 A * | 2/2021 | ........... | G02B 27/646 |
| CN | 112346283 | 2/2021 | | |
| CN | 113267937 | 8/2021 | | |
| JP | 2006106249 | 4/2006 | | |
| JP | 2015082072 | 4/2015 | | |
| JP | 2015215546 | 12/2015 | | |
| JP | 2017097298 | 6/2017 | | |
| JP | 2019020464 | 2/2019 | | |
| JP | 2019200270 | 11/2019 | | |

* cited by examiner

OPTICAL UNIT WITH SHAKE-CORRECTION FUNCTION

CROSS REFERENCE TO RELATED APPLICATION

The present application claims priority under 35 U.S.C. § 119 to Japanese Application No. 2020-036400 filed on Mar. 4, 2020, and the entire content of which is incorporated herein by reference.

BACKGROUND

Field of the Invention

The present invention relates to an optical unit with shake-correction function for correcting shake by rotating a camera module around an optical axis.

Description of the Related Documents

In an optical unit mounted on a mobile terminal or a mobile body, there is an optical unit that rotates a movable body provided with a camera module, along an optical axis, a first axis perpendicular to the optical axis, and a second axis perpendicular to the optical axis and the first axis, in order to suppress the disturbance of an image captured when the mobile terminal or the mobile body is moved. Japanese Unexamined Patent Publication No. 2019-200270 (Patent Document 1) describe such an optical unit with shake-correction function.

The optical unit with shake-correction function of Patent Document 1 has a movable body that includes a camera module, a rotational support structure that supports the movable body to be rotatable around an optical axis, a gimbal mechanism, and a fixed body that supports the movable body via the gimbal mechanism and the rotational support structure. The movable body is disposed on an inner circumference side of the fixed body. The rotational support structure has an intermediate frame body disposed between the movable body and the fixed body, and a plurality of leaf springs spanned between the movable body and the intermediate frame body in the radial direction. The plurality of leaf springs is arranged at equal angular intervals around the optical axis, and allow the movable body to rotate around the optical axis with respect to the intermediate frame body. The gimbal mechanism includes a gimbal frame, a first connecting mechanism that connects a first axis-side extension part and the intermediate frame body to be rotatable around the first axis, and a second connecting mechanism that connects the gimbal frame and the fixed body to be rotatable around the second axis.

Further, the optical unit with shake-correction function includes a rolling corrective-magnet drive structure that rotates the movable body around the optical axis. The rolling corrective-magnet drive structure includes a rolling corrective magnet fixed to the movable body, and a rolling corrective coil fixed to the fixed body and opposed to the rolling corrective magnet in the radial direction. The rolling corrective magnet is magnetized with two poles in the circumferential direction, and includes one magnetic polarization line extending in the direction of the optical axis. When viewed from the radial direction, the magnetic polarization line overlaps with an opening of the rolling corrective coil.

In the optical unit with shake-correction function of Patent Document 1 can rotate the movable body around a rotational axis that coincides with the optical axis of the camera module, even when the camera module rotates around the first axis or the second axis. However, since the movable body is supported to be rotatable by the plurality of leaf springs spanned in the radial direction, there is a problem in that the rotational axis of the movable body becomes unstable due to the elastic deformation of the leaf springs during the rotation.

In the consideration of these points, at least an embodiment of the present invention provides an optical unit with shake-correction function, which can rotate a movable body around a rotational axis coinciding with an optical axis, and prevent or suppress the rotational axis of the movable body from becoming unstable.

SUMMARY

An optical unit with shake-correction function according to at least an embodiment of the present invention includes a movable body including a camera module, a rotational support structure configured to rotatably support the movable body around an optical axis of a lens of the camera module, a gimbal mechanism configured to rotatably support the rotational support structure around a first axis intersecting with the optical axis and further around a second axis intersecting the optical axis and the first axis, a fixed body configured to support the movable body through the gimbal mechanism and the rotational support structure, and a rolling corrective-magnet drive structure configured to rotate the movable body around the optical axis. The rolling corrective-magnet drive structure includes a rolling corrective magnet fixed to one of the movable body and the fixed body, and two rolling corrective coils fixed to the other of the movable body and the fixed body. The rolling corrective magnet is configured to be polarized and magnetized in a circumferential direction and includes a first magnetic polarization line and a second magnetic polarization line which extend in parallel in a direction of the optical axis. The two rolling corrective coils are arranged in a circumferential direction around the optical axis. When viewed from a radial direction centered on the optical axis, the first magnetic polarization line overlaps with an opening of one of the two rolling corrective coils, and the second magnetic polarization line overlaps with an opening of the other of the rolling corrective coils.

According to at least an embodiment of the present invention, the rotational support structure, which rotatably supports the movable body around the optical axis, is rotatably supported by the gimbal mechanism so around the first axis and the second axis. Therefore, even in a state where the movable body rotates around the first axis or the second axis, it is possible to rotate the movable body around a rotation axis which coincides with the optical axis. Further, the rotational support structure includes a plurality of spherical objects that are inserted into a first annular groove provided on the movable body and a second annular groove provided on the plate holder, and roll. Therefore, the rotational axis of the movable body does not become unstable as compared with the case where the movable body is supported by a plurality of leaf springs to be rotatable. Further, the rolling corrective-magnet drive structure, which rotates the movable body around the optical axis, is polarized and magnetized in the circumferential direction, and includes the rolling corrective magnet having the first magnetic polarization line and the second magnetic polarization line and extending in parallel in the direction of the optical axis, and two rolling corrective coils. The two rolling corrective coils are arranged in the circumferential direction around the optical axis. When viewed from the radial direction centered on the optical axis, the first magnetic polarization line overlaps with the opening of one of the rolling corrective coils, and the second magnetic polarization line overlaps with the opening of the other of the rolling corrective coils. Therefore, as compared to the case where the rolling corrective-magnet drive structure includes one rolling corrective coil, it becomes easy to exert a large driving force by the rolling corrective-magnet drive structure. In other words, when the rolling corrective-magnet drive structure includes the two rolling corrective coils, it is possible to exert a predetermined driving force even when the length of the effective side of each of the rolling corrective coils is shortened, as compared with the case where the rolling corrective-magnet drive structure includes one rolling corrective coil. Here, the effective side of each of the rolling corrective-magnet drive structures extends in the direction in which the magnetic polarization line of the rolling corrective magnet extends. Therefore, according to at least an embodiment of the present invention, it is possible to reduce the size of each of the rolling corrective coils in the direction of the optical axis. As a result, it is possible to prevent the fixed body from becoming large in the direction of the optical axis.

In at least an embodiment of the present invention, the movable body may include a holder including a frame portion to surround the camera module from an outer circumference side centered on the optical axis. The fixed body may include the case to surround the frame portion from an outer circumference side. The rolling corrective magnet may be fixed to the frame portion, and the two rolling corrective coils may be fixed to the case on a side opposite to the rolling corrective magnet. As a result, it possible to prevent the rolling corrective magnet from contacting with each of the rolling corrective coils, and prevent each of the rolling corrective coils from being disconnected. Further, when the two rolling corrective coils are fixed to the case on the side opposite to the rolling corrective magnet, the case is interposed between the two rolling corrective coils and the rolling corrective magnet. Therefore, the two rolling corrective coils and the rolling corrective magnet is likely to be spaced apart from each other in the radial direction. On the other hand, the rolling corrective-magnet drive structure includes the two rolling corrective coils. Therefore, even when the two rolling corrective coils and the rolling corrective magnet is spaced, it is possible to secure a driving force by the rolling corrective-magnet drive structure.

In at least an embodiment of the present invention, it is desirable that the holder is made of magnetic metal, and the case is made of non-magnetic metal. When the holder is made of magnetic metal, the holder functions as a yoke of the rolling corrective magnet. Therefore, it is easy to ensure a driving force of the rolling corrective-magnet drive structure. Further, when the case is made of non-magnetic metal, it is easy to thin the case in the radial direction, as compared with a case where the case is made of resin. Accordingly, even when the case is interposed between the rolling corrective magnet and the rolling drive coil, the rolling corrective magnet and the rolling drive coil can be brought closer to each other in the radial direction. Therefore, it is easy to ensure a driving force of the rolling corrective-magnet drive structure.

In at least an embodiment of the present invention, the rotational support structure may include the first annular groove provided on the movable body in a state of being coaxial with the optical axis, a plate roller including the second annular groove to face the first annular groove in the direction of the optical axis, a plurality of spherical objects configured to be inserted into the first annular groove and the second annular groove to roll between the movable body and the plate roller, and a pressurization structure configured to apply a force to bring the first annular groove and the second annular groove closer to each other in the direction of the optical axis. The gimbal mechanism may be configured to rotatably support the plate roller around the first axis. The plate roller may be non-magnetic. The pressurization structure may include a magnet component fixed to a portion of the plate roller in the circumferential direction around the optical axis, and a magnet configured to be fixed to a portion of the movable body in the circumferential direction and attract the magnet component. According to this configuration, both of the magnetic component and the magnet, which constitute the pressurization structure, are provided on a portion in the circumferential direction around the optical axis. Therefore, when the magnetic component is attracted to the magnet, the angular position of the movable body with respect to the plate holder is defined around the optical axis. As a result, it is possible to define a reference angular position of the movable body around the optical axis by the pressurization structure.

In at least an embodiment of the present invention, the optical unit further may include a position sensor configured to detect an angular position of the movable body around the optical axis. The position sensor may include a first Hall element located in an inner circumference side of an opening in one of the rolling corrective coils when viewed from the radial direction. According to this configuration, it is possible to detect the angular position of the movable body based on the output from the first Hall element.

In at least an embodiment of the present invention, the position sensor may include a second Hall element located in an inner circumference side of an opening of the other of the rolling corrective coils when viewed from the radial direction. According to this configuration, it is possible to output the angular position of the movable body based on the outputs from the first Hall element and the second Hall element.

In at least an embodiment of the present invention, the rolling corrective magnet may be configured to be magnetized with three poles in the circumferential direction, and the position sensor may be configured to output a differential signal of a first output from the first Hall element and a second output from the second Hall element. According to this configuration, it is possible to accurately detect the angular position of the movable body based on the differential signal.

In at least an embodiment of the present invention, the rolling corrective magnet may be configured to be magnetized with four poles in the circumferential direction, and include three magnetic polarization lines to extend in parallel in the direction of the optical axis. Two of the three magnetic polarization lines located on both sides in the circumferential direction may be the first magnetic polarization line and the second magnetic polarization line, respectively. And, the position sensor may be configured to output an addition signal of a first output from the first Hall element and a second output from the second Hall element. According to this configuration, it is possible to accurately detect the angular position of the movable body based on the addition signal.

In at least an embodiment of the present invention, the optical unit may include a position sensor configured to detect an angular position of the movable body around the optical axis. The rolling corrective magnet may be configured to be magnetized with four poles in the circumferential direction, and include three magnetic polarization lines to extend in parallel in the direction of the optical axis. Two of the three magnetic polarization lines located on both sides in the circumferential direction may be the first magnetic polarization line and the second magnetic polarization line, respectively. And, the position sensor may include a Hall element disposed at a position overlapping with a third magnetic polarization line located between the first magnetic polarization line and the second magnetic polarization line in the circumferential direction when viewed from the radial direction. According to this configuration, it is possible to output the angular position of the movable body, based on the output from the Hall element disposed at the position overlapping with the third magnetic polarization line.

In at least an embodiment of the present invention, the optical unit further may include a shake corrective-magnet drive structure configured to rotate the movable body around the first axis and the second axis. The shake corrective-magnet drive structure and the rolling corrective-magnet drive structure may be arranged in the circumferential direction around the optical axis. The shake corrective-magnet drive structure may include a shake-correction magnet fixed to one of the movable body and the fixed body, and a shake-correction coil fixed to the other of the movable body and the fixed body. The shake-correction magnet may be configured to be polarized and magnetized in the direction of the optical axis, and include one magnetic polarization line to extend in a circumferential direction. And, when viewed from the radial direction, the magnetic polarization line of the shake-correction magnet may overlap with an opening of the shake-correction coil. According to this configuration, the effective side of the shake-correction coil extends in the circumferential direction. Therefore, it is not necessary to enlarge the shake-correction coil in the direction of the optical axis in order to ensure the driving force due to the shake corrective-magnet drive structure. As a result, it possible to prevent the fixed body from becoming large in the direction of the optical axis.

Effects of the Invention

According to at least an embodiment of the present invention, the rotational support structure, which supports the movable body to be rotatable around the optical axis, is rotatably supported by the gimbal mechanism around the first axis and the second axis. Therefore, even in a state where the movable body rotates around the first axis or the second axis, it is possible to rotate the movable body around the rotational axis which coincides with the optical axis. Further, the rotational support structure includes the plurality of spherical objects that are inserted into the first annular groove provided on the movable body and the second annular groove provided on the plate holder and roll. Therefore, the rotation of the movable body is stabilized. Further, since the rolling corrective-magnet drive structure includes the two rolling corrective coils, it is possible to exert a predetermined driving force even when the length of the effective side of each of the rolling corrective coils is shortened. As a result, it possible to miniaturize each of the rolling corrective coils in the direction of the optical axis, it is possible to prevent the fixed body from becoming large in the direction of the optical axis.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

Hereinafter, embodiments of an optical unit with shake-correction function to which at least an embodiment of the present invention is applied will be described with reference to the drawings.

Overall Configuration

Figure 1:
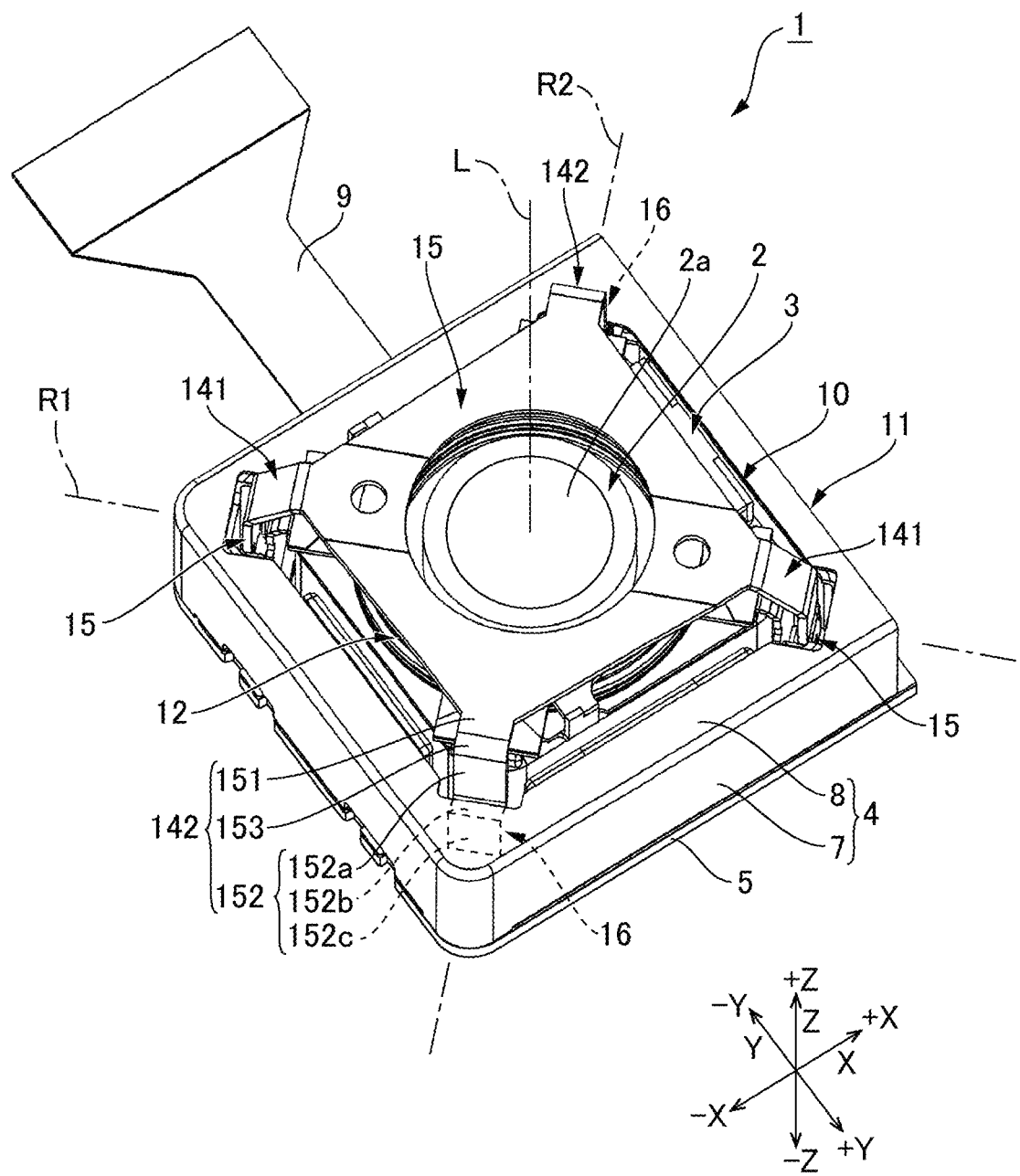
FIG. 1 is a perspective view of an optical unit with shake-correction function.
Figure 2:
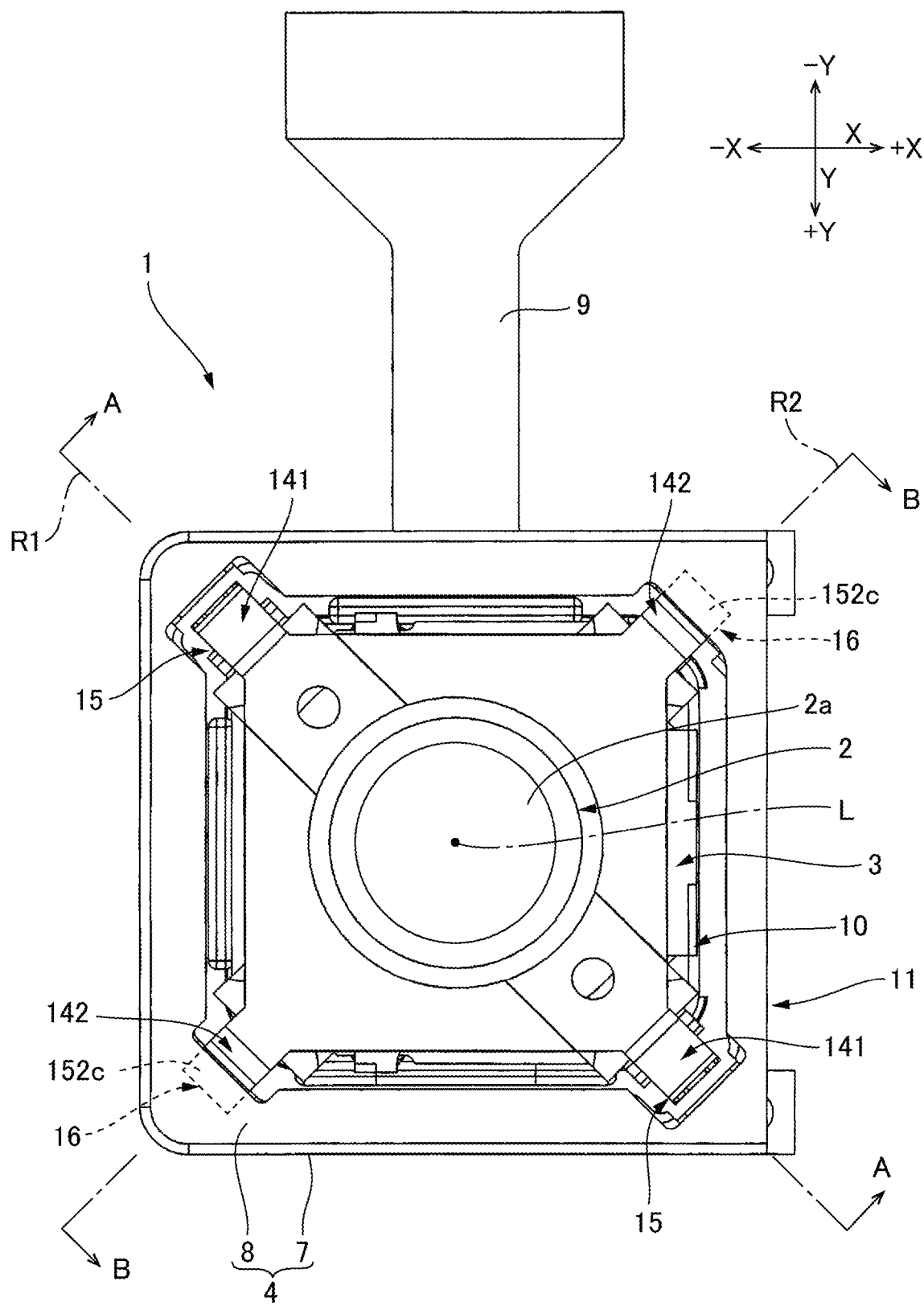
FIG. 2 is a plan view of the optical unit with shake-correction function when viewed from an object side.
Figure 3:
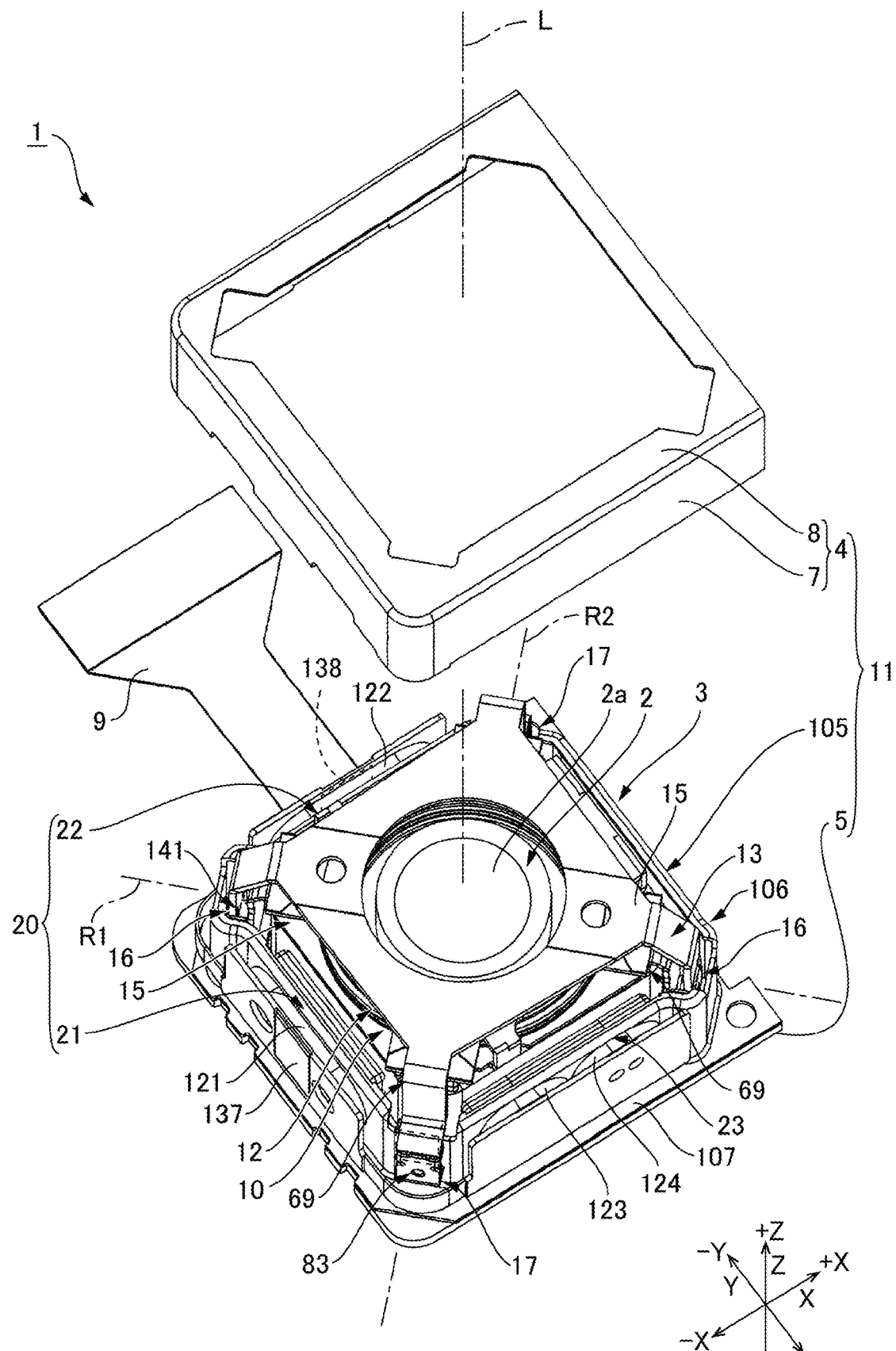
FIG. 3 is an exploded perspective view of the optical unit with shake-correction function.
Figure 4:
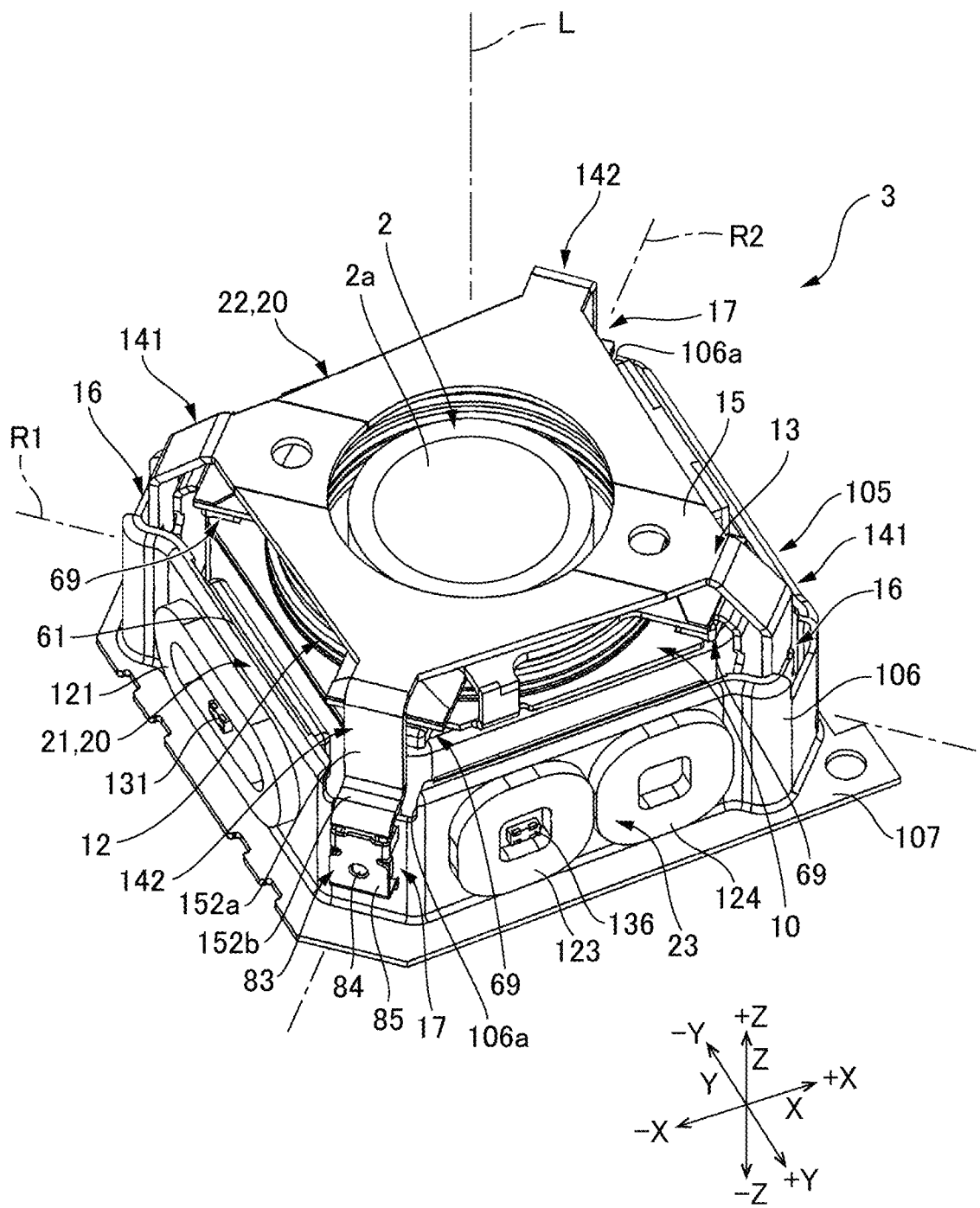
FIG. 4 is a perspective view of an optical unit main body.
Figure 5:
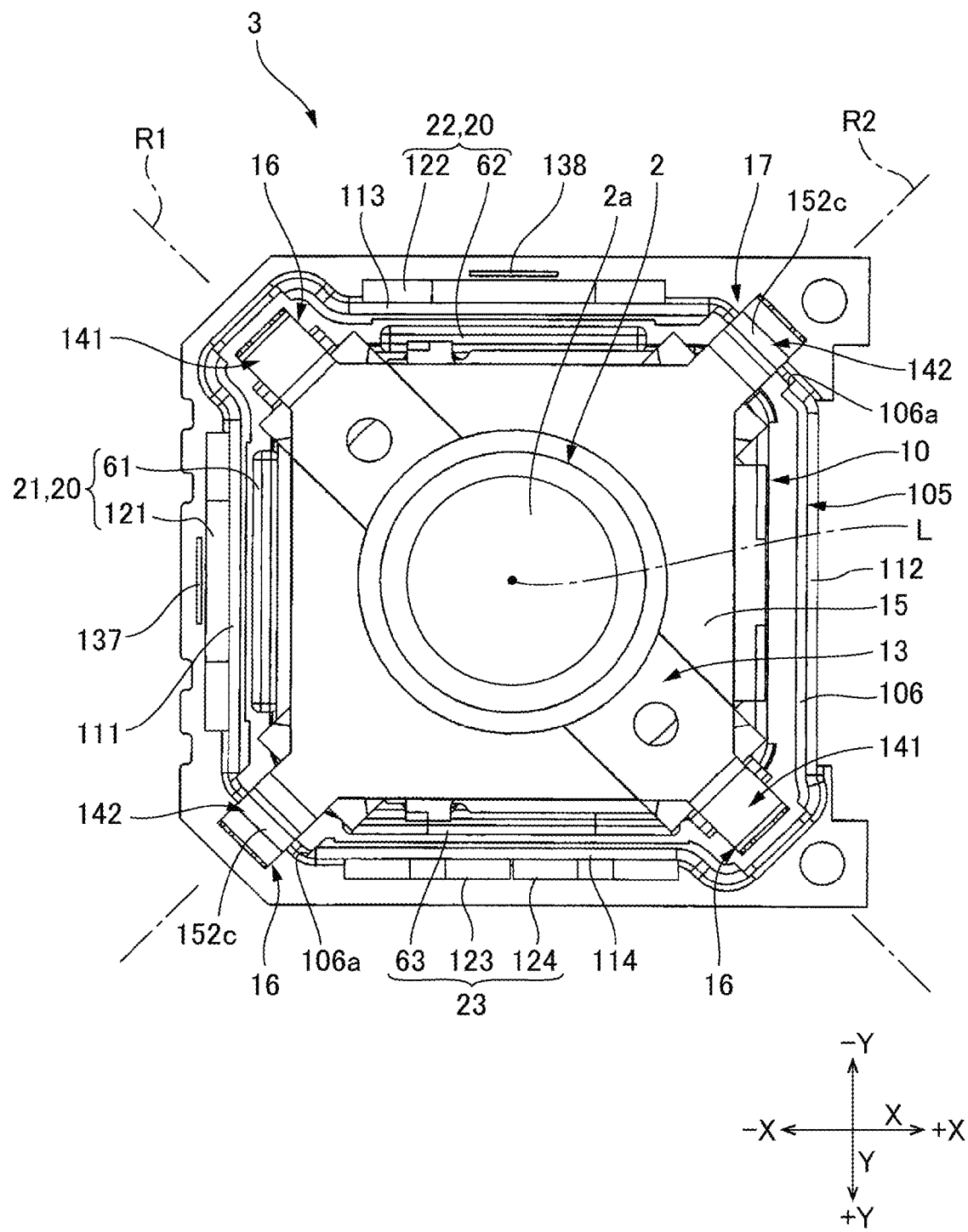
FIG. 5 is a plan view of the optical unit main body.
Figure 6:
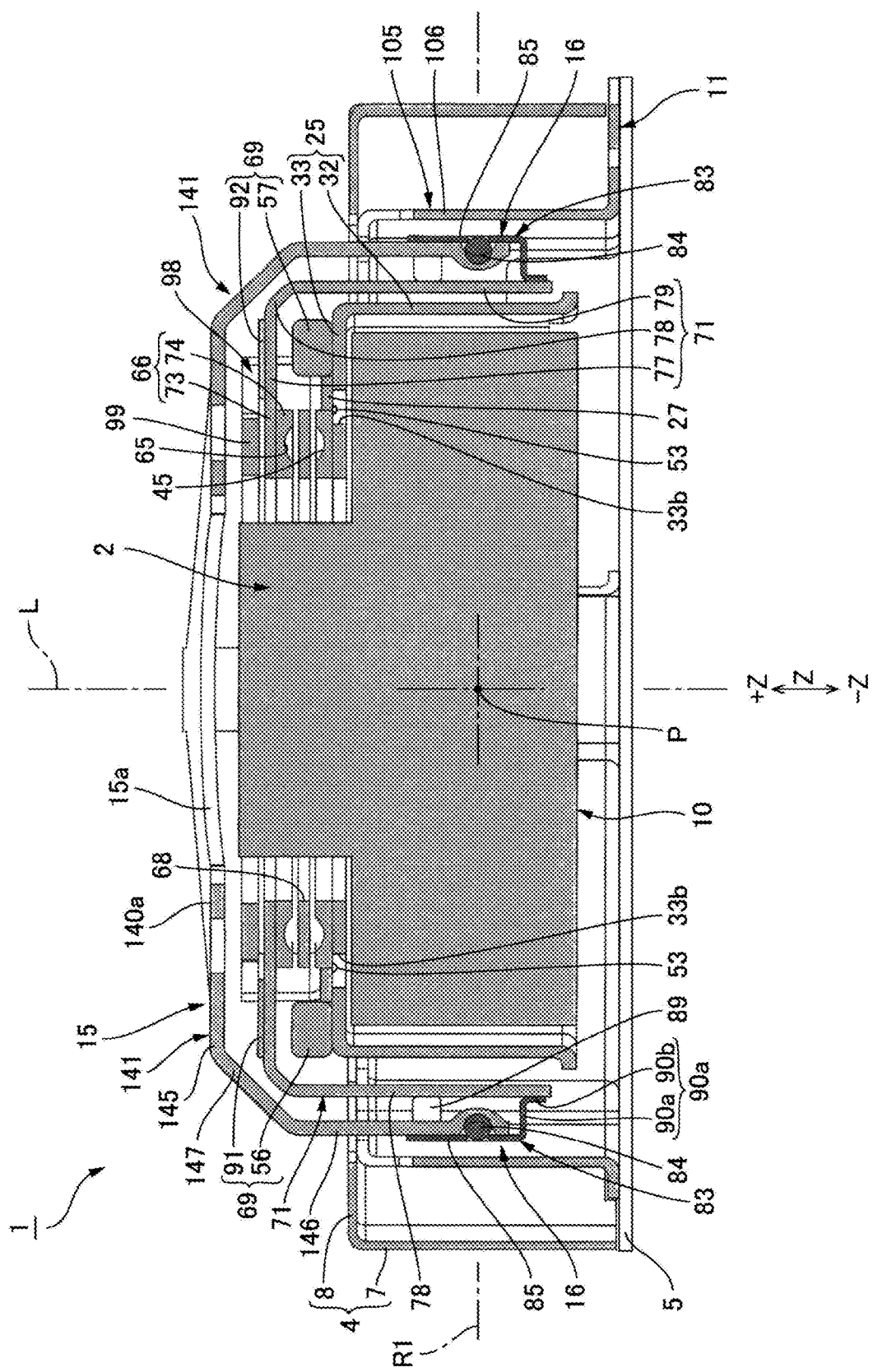
FIG. 6 is a cross-sectional view taken along the line A-A of FIG. 2.
Figure 7:
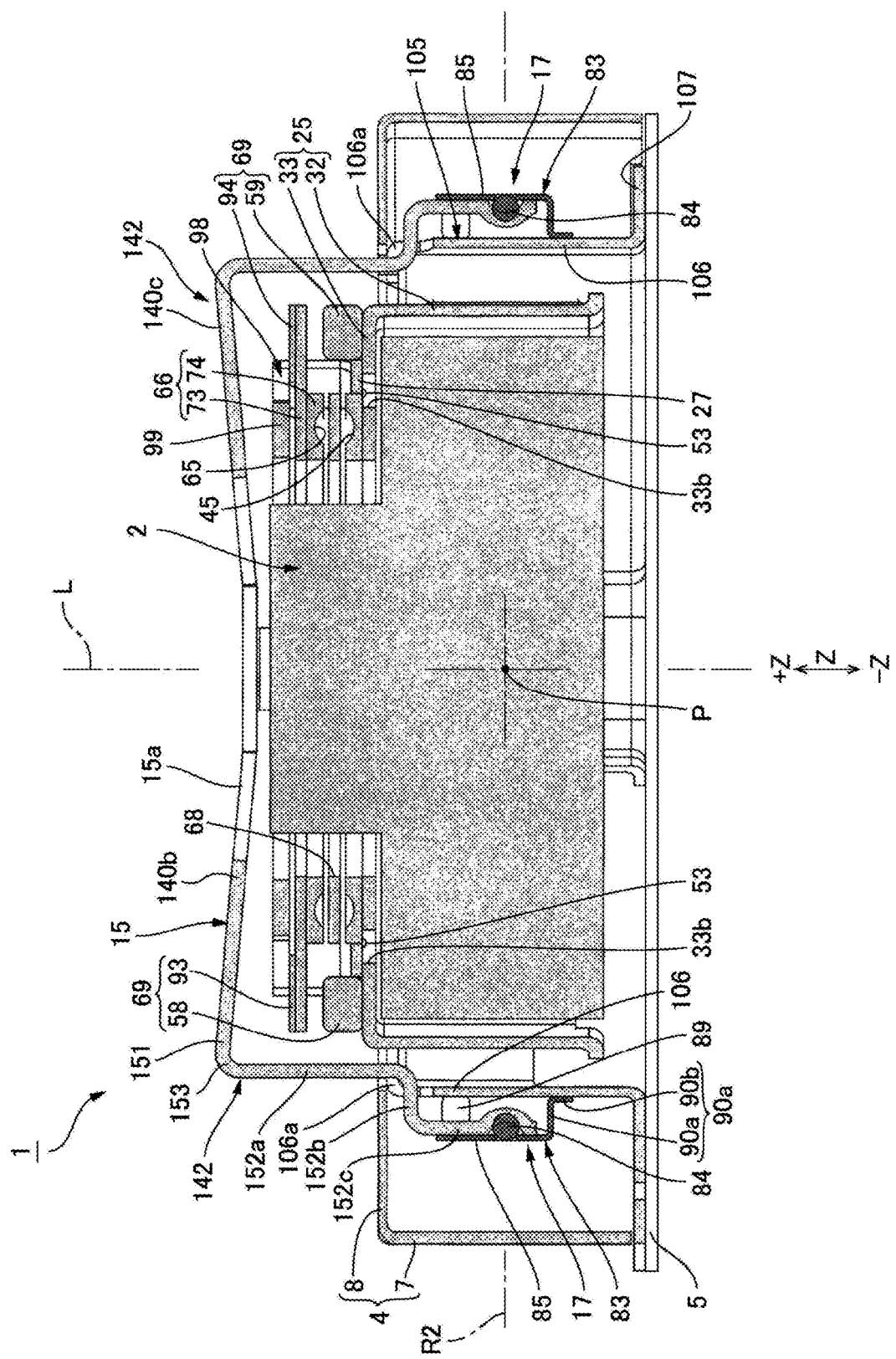
FIG. 7 is a cross-sectional view taken along the line B-B of FIG. 2.

FIG. 1 is a perspective view of an optical unit with shake-correction function. FIG. 2 is a plan view of the optical unit with shake-correction function when viewed from an object side. FIG. 3 is an exploded perspective view of the optical unit with shake-correction function. FIG. 4 is a perspective view of an optical unit main body. In FIG. 4, a base, a flexible printed board, a first magnetic plate, and a second magnetic plate are omitted. FIG. 5 is a plan view of the optical unit main body. In FIG. 5, the base and the flexible printed board are omitted. FIG. 6 is a cross-sectional view taken along the line A-A of FIG. 2. FIG. 7 is a cross-sectional view taken along the line B-B of FIG. 2.

As illustrated in FIG. 1, the optical unit 1 with shake-correction function includes an optical unit main body 3 that includes a camera module 2, a cover 4 that accommodates the optical unit main body 3, and a base 5 that covers the optical unit main body 3 from the counter object side. The cover 4 includes a cover frame portion 7 with a substantially rectangular shape that covers the optical unit main body 3 from the outer circumference side, and an object-side end plate portion 8 with a frame shape that protrudes toward the inner circumferential side from the edge of the cover frame portion 7 on the object side. The base 5 has a plate shape. The camera module 2 includes a lens 2a, and an imaging element (not illustrated) disposed on an optical axis L of the lens 2a. Further, as illustrated in FIG. 3, the optical unit main body 3 includes a flexible printed board 9 that is routed along the outer circumference surface of the optical unit main body 3.

The optical unit 1 with shake-correction function is used, for example, in an optical device such as a camera-equipped mobile phone or a drive recorder, or an optical device such as an action camera or a wearable camera mounted on a moving object such as a helmet, a bicycle, or a radio-control helicopter. In such an optical device, when the optical device shakes during capturing, the captured image is distorted. The optical unit 1 with shake-correction function corrects the inclination of the camera module 2, based on the acceleration, the angular velocity, the shake amount, and the like, which are detected by a detection unit such as a gyroscope, in order to prevent the captured image from being inclined.

The optical unit 1 with shake-correction function of the present example rotates the camera module 2 around the optical axis L of the lens 2a, around a first axis R1 orthogonal to the optical axis L, and around a second axis R2 orthogonal to the optical axis L and the first axis R1 to perform shake correction.

In the following description, the three axes orthogonal to one another are referred to as the direction of the X axis, the direction of the Y axis, and the direction of the Z axis. Further, one side in the direction of the X axis is referred to as a −X direction, and the other side is referred to as a +X direction. One side in the direction of the Y axis is referred as a −Y direction, and the other side is referred as a +Y direction. One side in the direction of the Z axis is referred to as a −Z direction, and the other side is referred to as a +Z direction. The direction of the Z axis is the direction of the optical axis. The −Z direction is a counter-object side of the camera module 2. The +Z direction is an object side of the camera module 2. The first axis R1 and the second axis R2 are inclined by 45 degrees with respect to the X axis and the Y axis around the Z axis (around the optical axis).

As illustrated in FIG. 2, the optical unit 1 with shake-correction function includes a movable body 10 that includes the camera module 2, and a fixed body 11 that surrounds the movable body 10 from the outside. The fixed body 11 includes the cover 4 and the base 5. As illustrated in FIG. 3, the optical unit main body 3 includes a rotational support structure 12 and a gimbal mechanism 13. The rotational support structure 12 rotatably supports the movable body 10 around the Z axis. The gimbal mechanism 13 rotatably supports the rotational support structure 12 around the first axis R1 and the second axis R2.

The gimbal mechanism 13 includes a gimbal frame 15, and a first connecting mechanism 16 that connects the gimbal frame 15 and the rotational support structure 12 rotatable around the first axis R1. The first connecting mechanism 16 is provided on both sides of the gimbal frame 15 in the direction of the first axis R1. Further, the gimbal mechanism 13 includes a second connecting mechanism 17 that connects the gimbal frame 15 and the fixed body 11 so as to be rotatable around the second axis R2. The second connecting mechanism 17 is provided on both sides of the gimbal frame 15 in the direction of the second axis R2. Accordingly, the movable body 10 is supported by the fixed body 11 in a state of being rotatable around the first axis R1 and the second axis R2 via the rotational support structure 12 and the gimbal mechanism 13.

Further, the optical unit main body 3 includes a shake corrective-magnet drive structure 20 for rotating the movable body 10 around the first axis R1 and around the second axis R2. The shake corrective-magnet drive structure 20 includes a first shake corrective-magnet drive structure 21 that generates a driving force around the Y axis with respect to the movable body 10, and a second shake corrective-magnet drive structure 22 that generates a driving force around the X axis with respect to the movable body 10. The first shake corrective-magnet drive structure 21 and the second shake corrective-magnet drive structure 22 are arranged in the circumferential direction around the Z axis. In the present example, the first shake corrective-magnet drive structure 21 is disposed in the −X direction of the camera module 2. The second shake corrective-magnet drive structure 22 is disposed in the −Y direction of the camera module 2.

The movable body 10 rotates around the X axis and the Y axis by combining the rotation around the first axis R1 and the rotation around the second axis R2. Accordingly, the optical unit 1 with shake-correction function performs pitching correction around the X axis, yawing correction around the Y axis, and rolling correction around the Z axis.

Further, the optical unit main body 3 includes a rolling corrective-magnet drive structure 23 for rotating the movable body 10 around the Z axis. The first shake corrective-magnet drive structure 21, the second shake corrective-magnet drive structure 22, and, and the rolling corrective-magnet drive structure 23 are arranged in the circumferential direction around the Z axis. In the present example, the rolling corrective-magnet drive structure 23 is disposed in the +Y direction of the camera module 2. The rolling corrective-magnet drive structure 23 is located on the side opposite to the second shake corrective-magnet drive structure 22 with the optical axis L interposed therebetween.

Movable Body

Figure 8:
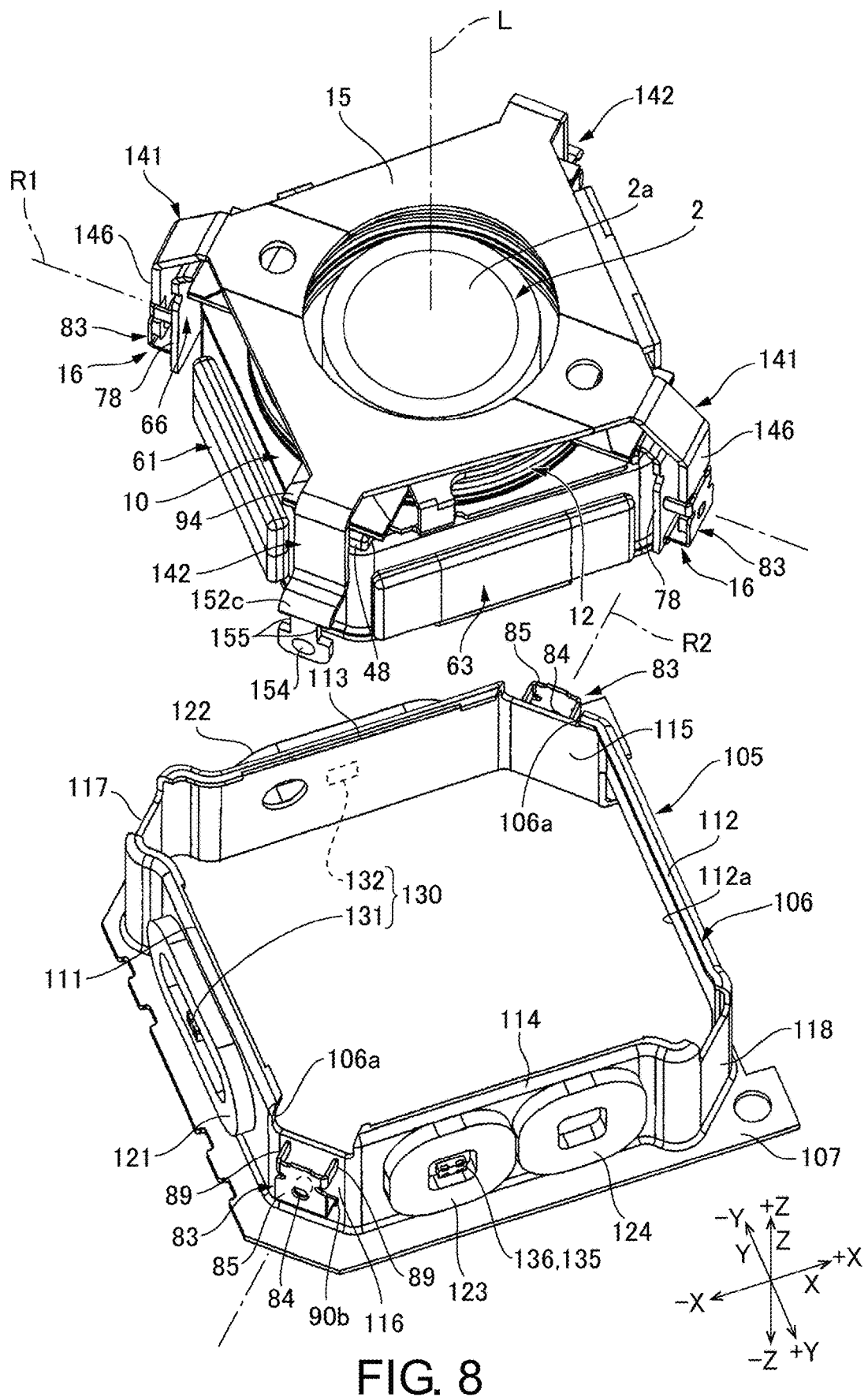
FIG. 8 is an exploded perspective view of the optical unit main body.
Figure 9:
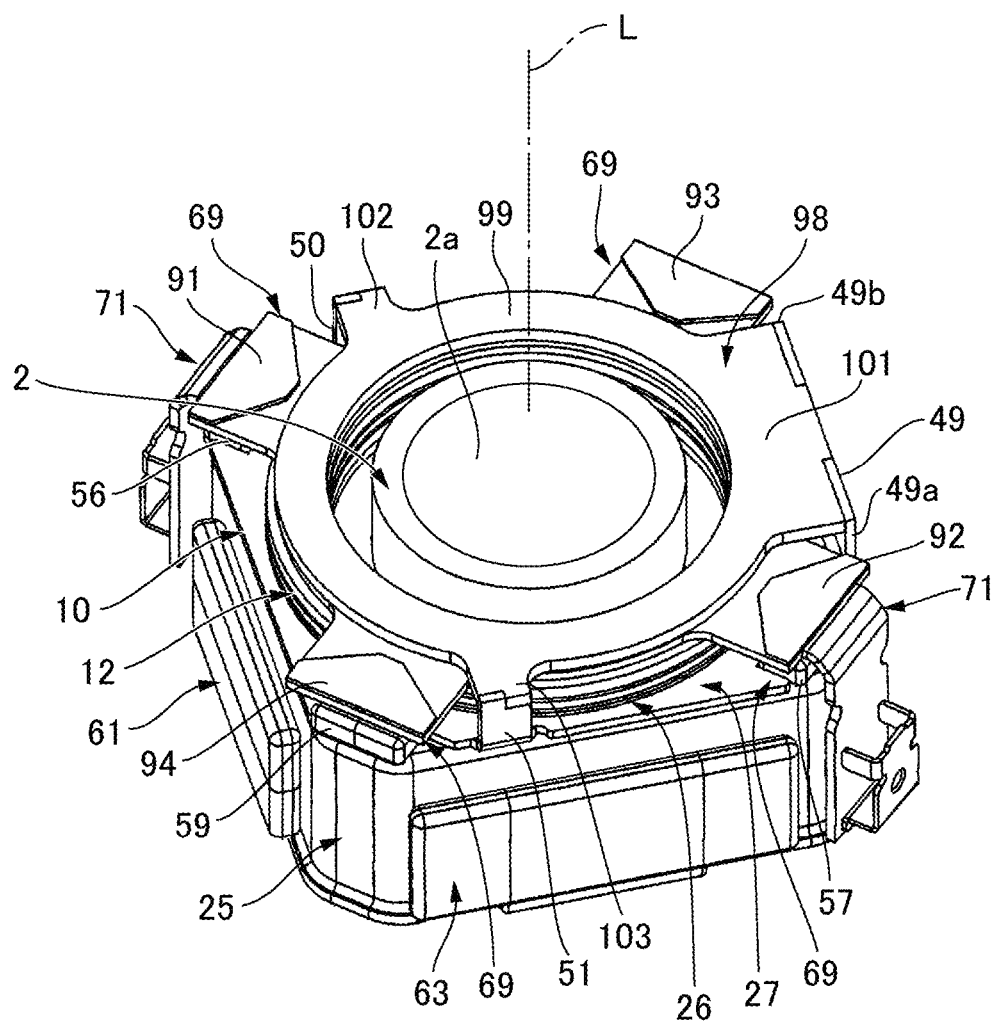
FIG. 9 is a perspective view of a movable body and a rotational support structure.
Figure 10:
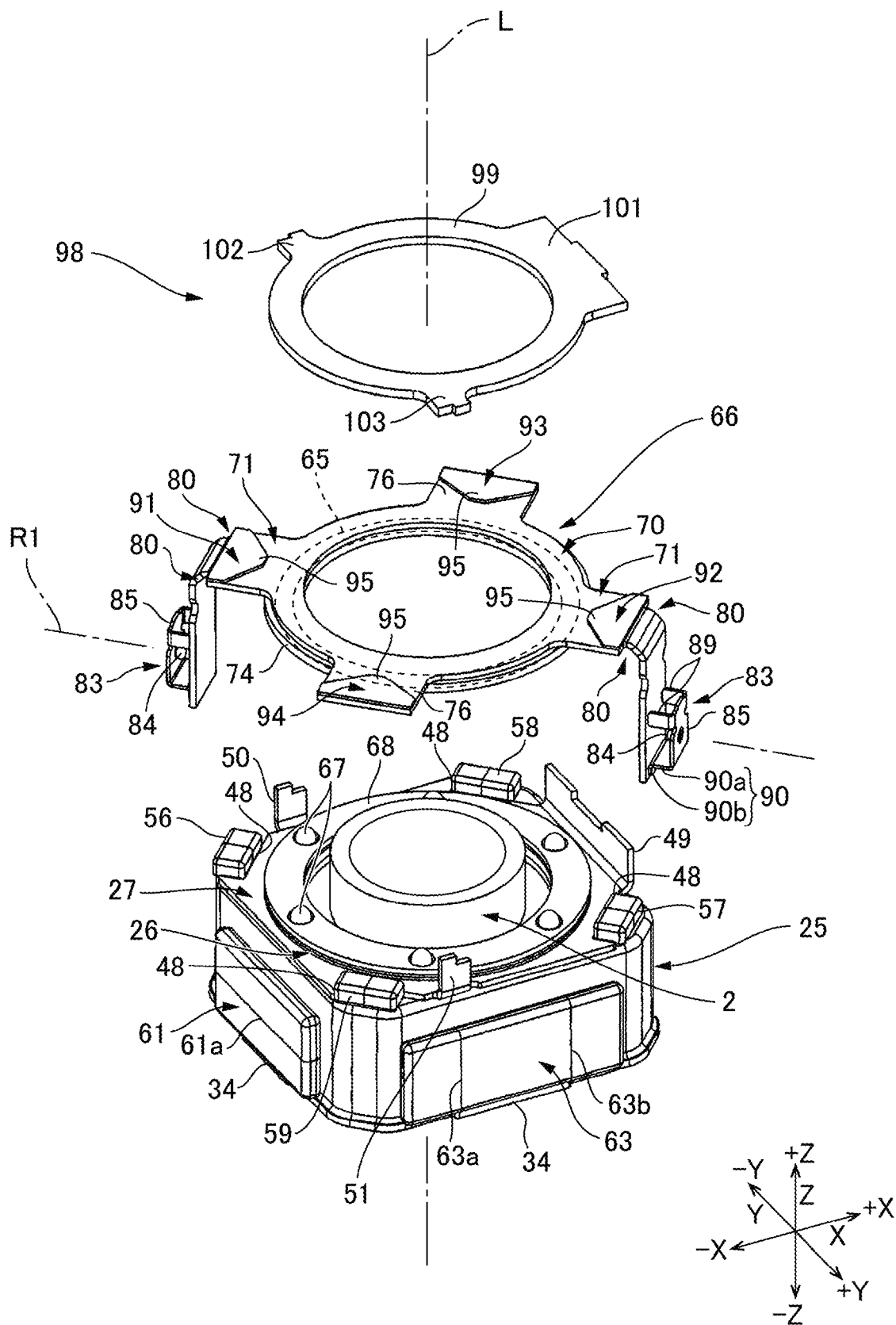
FIG. 10 is an exploded perspective view of the movable body and the rotational support structure.
Figure 11:
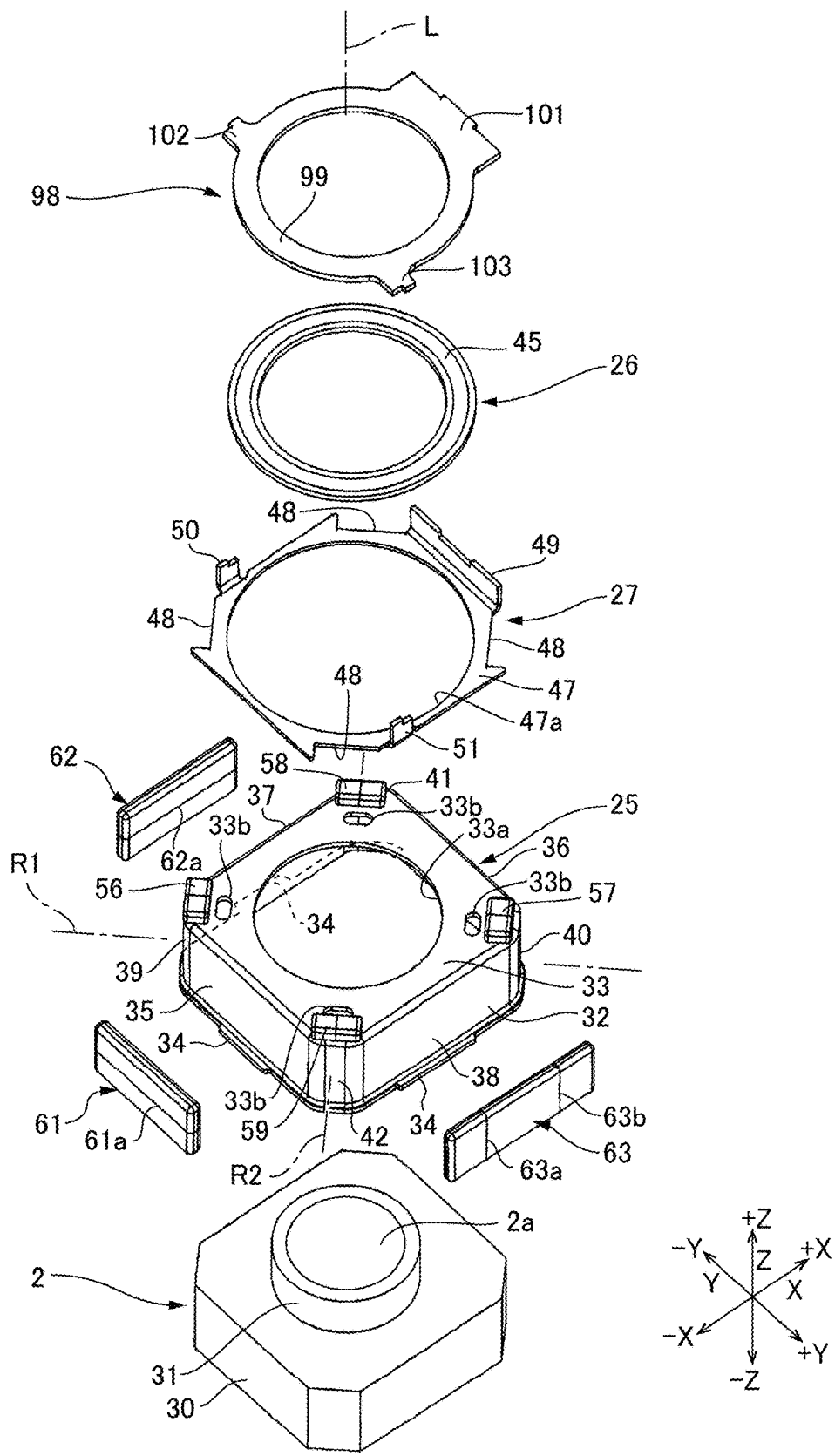
FIG. 11 is an exploded perspective view of the movable body.
Figure 12:
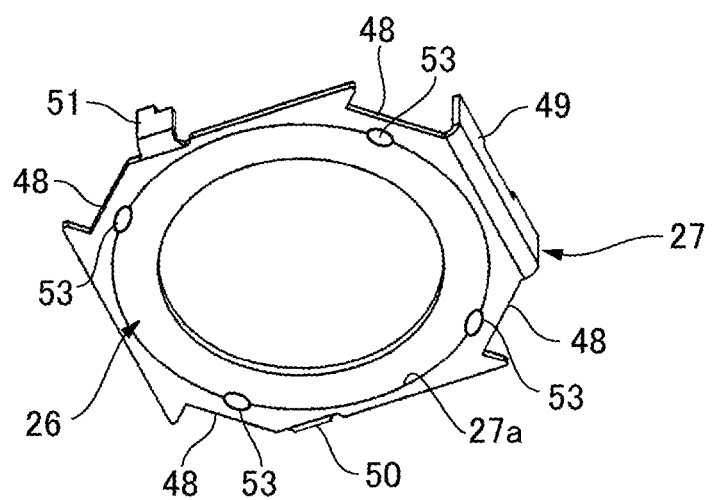
FIG. 12 is a perspective view of a first rail member and a stopper mechanism.
Figure 12:
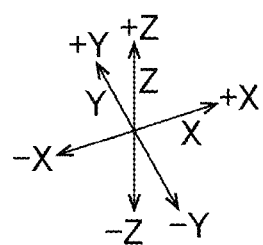
Figure 13:
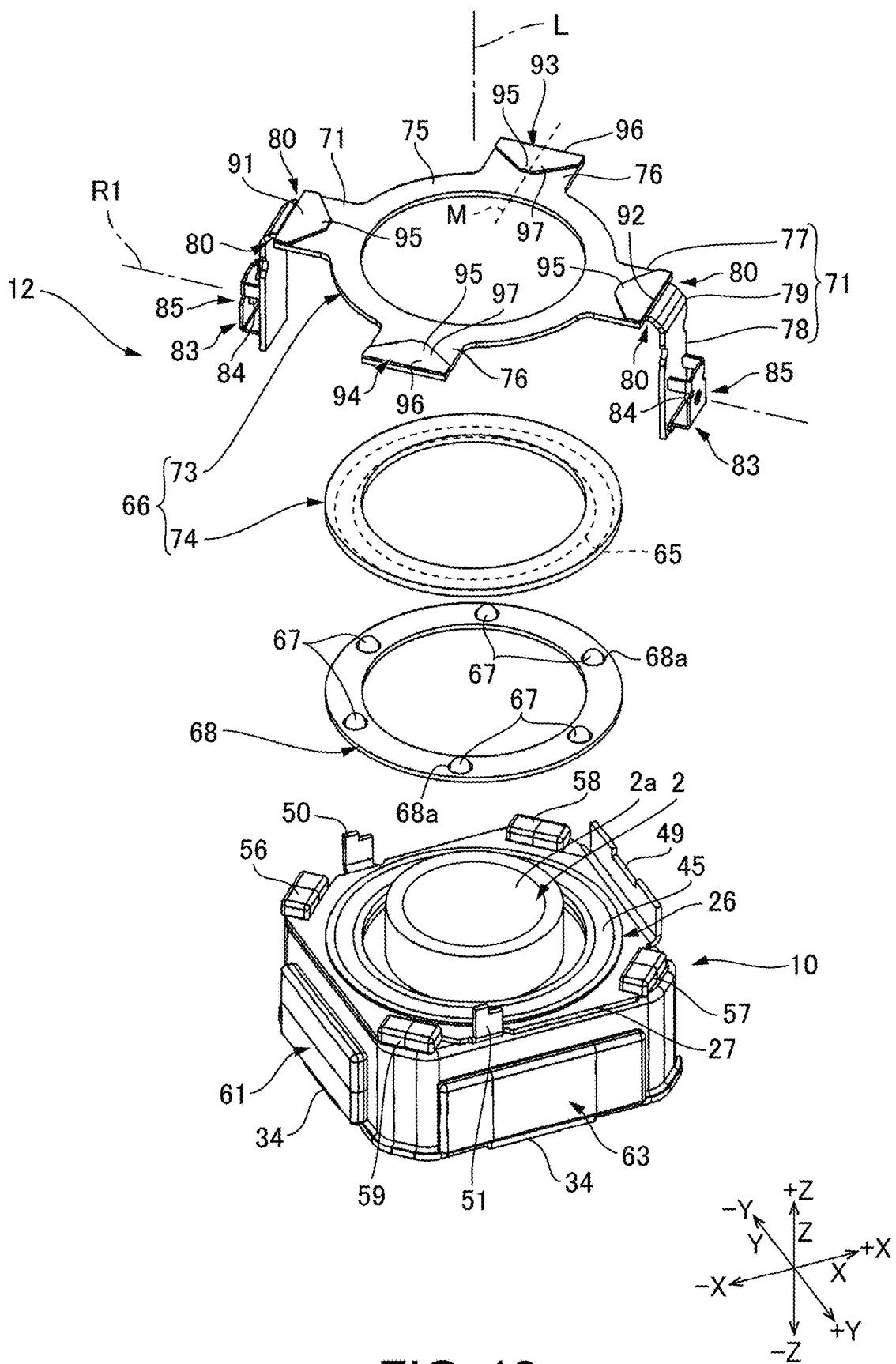
FIG. 13 is an exploded perspective view of the rotational support structure when viewed from an object side.
Figure 14:
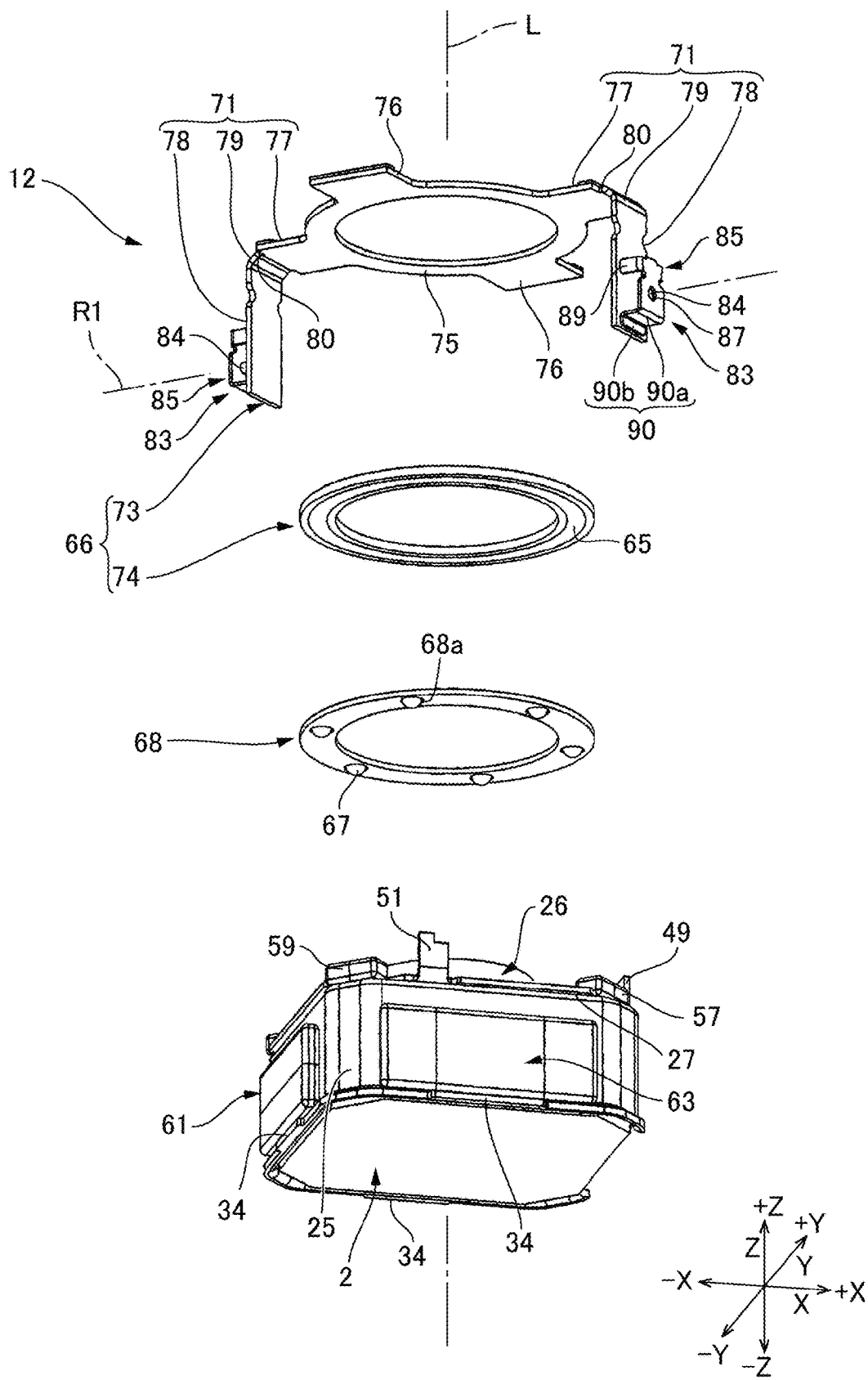
FIG. 14 is an exploded perspective view of the rotational support structure when viewed from the counter object side.

FIG. 8 is an exploded perspective view of the optical unit main body 3. FIG. 9 is a perspective view of the movable body 10 and the rotational support structure 12. FIG. 10 is an exploded perspective view of the movable body 10 and the rotational support structure 12. FIG. 11 is an exploded perspective view of the movable body. FIG. 12 is a perspective view of the first rail member and the stopper mechanism. In FIG. 12, the first rail member and the stopper mechanism are viewed from the −Z direction. FIG. 13 is an exploded perspective view of the rotational support structure 12 and the movable body 10 when viewed from the +Z direction. FIG. 14 is an exploded perspective view of the rotational support structure 12 and the movable body 10 when viewed from the −Z direction.

As illustrated in FIGS. 10 and 11, the movable body 10 includes the camera module 2, a holder 25 that holds the camera module 2, a first rail member 26 that is fixed to the holder 25, and a stopper mechanism 27 that is fixed to the holder 25.

As illustrated in FIG. 11, the camera module 2 includes a camera module main body portion 30, and a camera module cylindrical portion 31 that protrudes from the center of the camera module main body portion 30 in the +Z direction. The lens 2a is accommodated in the camera module cylindrical portion 31. The holder 25 includes a holder frame portion 32 that surrounds the camera module main body portion 30 from the outer circumference side, a holder end plate portion 33 with a frame shape that bends from the end of the holder frame portion 32 in the +Z direction toward the inner circumferential side, and a holder flange portion 34 that bends from the end of the holder frame portion 32 in the −Z direction toward the outer circumference side. The holder 25 is made of magnetic metal.

The holder end plate portion 33 includes a circular opening 33a coaxial with the optical axis L. The camera module cylindrical portion 31 penetrates the circular opening 33a. The holder end plate portion 33 extends in a direction orthogonal to the optical axis L along the surface of the camera module main body portion 30 in the +Z direction. The holder end plate portion 33 includes through-holes 33b that penetrate the holder end plate portion 33 in the direction of the Z axis at both sides of the first axis R1 where the sides sandwich the circular opening 33a. Further, the holder end plate portion 33 includes the through-holes 33b that penetrate the holder end plate portion 33 in the direction of the Z axis at both sides of the second axis R2 where the sides sandwich the circular opening 33a.

The holder frame portion 32 has an approximately octagonal shape when viewed from the +Z direction. The holder frame portion 32 includes a first side wall 35 and a second side wall 36 which extend parallel to the Y direction, and a third side wall 37 and a fourth side wall 38 which extend parallel to the X direction. The first side wall 35 is located in the −X direction of the second side wall 36. The third side wall 37 is located in the −Y direction of the fourth side wall 38. Further, the holder frame portion 32 includes a fifth side wall 39 and a sixth side wall 40 which are located diagonally in the direction of the first axis R1 direction, and a seventh side wall 41 and an eighth side wall 42 which are located diagonally in the direction of the second axis R2. The fifth side wall 39 is located in the −X direction of the sixth side wall 40. The seventh side wall 41 is located in the −Y direction of the eighth side wall 42.

The holder flange portion 34 is provided on the first side wall 35, the third side wall 37 (see FIG. 14), and the fourth side wall 38. The holder flange portion 34 protrudes in a direction orthogonal to the optical axis L.

The first rail member 26 has an annular shape, and is made of non-magnetic metal. A first annular groove 45 is provided on the end surface of the first rail member 26 in the +Z direction. In the present example, the first annular groove 45 is formed by cutting.

The stopper mechanism 27 is made of non-magnetic metal. The stopper mechanism 27 includes a board 47 having an opening 47a to which the first rail member 26 is fitted in the center thereof. The board 47 includes notches 48 at two outer circumferential side portions that overlap with the first axis R1 when viewed from the direction of the Z axis on the edge of the outer circumferential side. Further, the board 47 includes notches 48 at two outer circumferential side portions that overlap with the second axis R2 when viewed from the direction of the Z axis on the edge of the outer circumferential side. Further, the stopper mechanism 27 includes, on the edge of the outer circumferential side of the board 47, a first bent portion 49 that bends in the +Z direction from the edge of the outer circumferential side portion located in the +X direction of the opening 47a, and a second bent portion 50 that bends in the +Z direction from the edge of the outer circumferential side portion located in the −Y direction of the opening 47a, and a third bent portion 51 that bends in the +Z direction from the edge of the outer circumferential side portion located in the +Y direction of the opening 47a. The first bent portion 49 has a width in the circumferential direction that is longer than that of each of the second bent portion 50 and the third bent portion 51.

As illustrated in FIGS. 12 and 13, the first rail member 26 is fixed to the stopper mechanism 27 by welding in a state of being fitted into the opening 47a of the stopper mechanism 27. Thereafter, the first rail member 26 is fixed to the holder end plate portion 33 by welding together with the stopper mechanism 27.

More specifically, in the first rail member 26 and the stopper mechanism 27, the opening edge of the opening 47a of the stopper mechanism 27 and the edge of the outer circumferential side of the first rail member 26 are welded from the −Z direction. Further, the welding is performed at four locations at equal angular intervals around the Z axis. As a result, as illustrated in FIG. 12, four welding marks 53, which fix the first rail member 26 and the stopper mechanism 27 to each other, are provided on the surface of the first rail member 26 and the stopper mechanism 27 on the side of the holder end plate portion 33.

Next, the first rail member 26 and the stopper mechanism 27, which are integrated by welding, are welded to the holder end plate portion 33. Here, when the first rail member 26 and the stopper mechanism 27 are welded to the holder end plate portion 33, the four welding marks 53 are inserted into the four through-holes 33b (see FIG. 11) of the holder end plate portion 33, respectively. Accordingly, the welding marks 53 are received in the through-holes 33b, respectively. Therefore, the first rail member 26 and the stopper mechanism 27 are fixed to the holder 25 in a state of being in close contact with the holder end plate portion 33. In a state in which the first rail member 26 and the stopper mechanism 27 are fixed to the holder 25, as illustrated in FIG. 13, the first rail member 26 is perpendicular to the optical axis, and the first annular groove 45 is coaxial with the optical axis L.

Further, a first magnet 56, a second magnet 57, a third magnet 58, and a fourth magnet 59 are fixed to the holder end plate portion 33. The first magnet 56, the second magnet 57, the third magnet 58, and the fourth magnet 59 are arranged at four locations at equal angular intervals in the circumferential direction around the Z axis. The first magnet 56 and the second magnet 57 are fixed to the edge portions on both sides of the circular opening 33a in the direction of the first axis R1 in the holder end plate portion 33. The third magnet 58 and the fourth magnet 59 are fixed to the edge portions on both sides of the circular opening 33a in the direction of the second axis R2 in the holder end plate portion 33. Each of the magnets 56 to 59 is magnetized with two poles in the circumferential direction. The magnetic polarization lines of the magnets 56 to 59 extend in the radial direction from the respective centers of the magnets 56 to 59 in the circumferential direction.

Here, the first magnet 56, the second magnet 57, the third magnet 58, and the fourth magnet 59 are fixed to the holder end plate portion 33 after the first rail member 26 and the stopper mechanism 27 are welded to the holder end plate portion 33. When the first magnet 56 and the second magnet 57 are fixed to the holder end plate portion 33, the magnets 56 and 57 are brought into contact with the opening edges of each of the notches 48, which are provided on both sides of the board 47 of the stopper mechanism 27 in the direction of the first axis R1, respectively. Further, when the third magnet 58 and the fourth magnet 59 are fixed to the holder end plate portion 33, the magnets 58 and 59 are brought into contact with the opening edges of each of the notches 48, which are provided on both sides of the board 47 of the stopper mechanism 27 in the direction of the second axis R2, respectively. As a result, each of the magnets 56 to 59 is positioned on the movable body 10 in the circumferential direction and in the radial direction.

As illustrated in FIG. 11, a first shake corrective magnet 61 is fixed to the first side wall 35 of the holder frame portion 32. The first shake corrective magnet 61 is magnetized with two poles in the direction of the Z axis. A magnetic polarization line 61a of the first shake corrective magnet 61 extends in the circumferential direction. A second shake corrective magnet 62 is fixed to the third side wall 37. The second shake corrective magnet 62 is magnetized with two poles in the direction of the Z axis. A magnetic polarization line 62a of the second shake corrective magnet 62 extends in the circumferential direction. The first shake corrective magnet 61 and the second shake corrective magnet 62 are arranged so as to point the same pole in the direction of the Z axis.

A rolling corrective magnet 63 is fixed to the fourth side wall 38. The rolling corrective magnet 63 is magnetized with three poles in the circumferential direction. The rolling corrective magnet 63 includes a first magnetic polarization line 63a and a second magnetic polarization line 63b that extend in parallel to the direction of the Z axis. The first magnetic polarization line 63a is located in the −X direction of the second magnetic polarization line 63b. The rolling corrective magnet 63 is disposed on the side opposite to the second shake corrective magnet 62 with the optical axis L interposed therebetween.

Here, the first shake corrective magnet 61, the second shake corrective magnet 62, and the rolling corrective magnet 63 abut against the holder flange portion 34 from the + direction of the Z axis. That is, the holder flange portion 34 positions the first shake corrective magnet 61, the second shake corrective magnet 62, and the rolling corrective magnet 63 in the direction of the Z axis.

Note that, as illustrated in FIG. 9, a second stopper mechanism 98 is fixed to the stopper mechanism 27 in the +Z direction. The second stopper mechanism 98 will be described later.

Rotational Support Mechanism

As illustrated in FIGS. 13 and 14, the rotational support structure 12 includes the first annular groove 45 provided on the movable body 10 in a state of being coaxial with the optical axis L, and a plate roller 66 having a second annular groove 65 opposed to the first annular groove 45 in the direction of the Z axis. Further, the rotational support structure 12 includes a plurality of spherical objects 67 which are inserted into the first annular groove 45 and the second annular groove 65 and roll between the movable body 10 and the plate roller 66, and an annular retainer 68 which holds the spherical objects 67 so as to be rollable. Further, as illustrated in FIG. 9, the rotational support structure 12 includes a pressurization structure 69 that applies a force for bringing the first annular groove 45 and the second annular groove 65 closer to each other in the direction of the Z axis.

As illustrated in FIG. 10, the plate roller 66 includes a plate roller annular portion 70 that surrounds the optical axis L, a pair of plate roller extension portions 71 that protrude from the plate roller annular portion 70 toward both sides in the direction of the first axis R1, and a pair of plate roller protruding portions 76 that protrude from the plate roller annular portion 70 toward both sides in the direction of the second axis R2. The second annular groove 65 is provided on the plate roller annular portion 70.

More specifically, as illustrated in FIGS. 13 and 14, the plate roller 66 includes a plate roller main body portion 73 and a second rail member 74 having a second annular groove 65. The plate roller main body portion 73 includes an annular plate portion 75 that surrounds the optical axis L, the pair of plate roller extension portions 71 that protrude from the annular plate portion 75 toward both sides in the direction of the first axis R1, and the pair of plate roller protruding portions 76 that protrude from the annular plate portion 75 toward both sides in the direction of the second axis R2. The second rail member 74 is fixed to the annular plate portion 75, and surrounds the optical axis L.

Both of the second rail member 74 and the plate roller main body portion 73 are made of non-magnetic metal. The second rail member 74 is fixed to the annular plate portion 75 of the plate roller main body portion 73 by welding. As a result, the second rail member 74 and the annular plate portion 75 constitute the plate roller annular portion 70. Here, the second rail member 74 and the first rail member 26 are the same member. The second rail member 74 and the first rail member 26 are disposed coaxially with each other, so that the first annular groove 45 and the second annular groove 65 face each other in the direction of the Z axis.

Each of the spherical objects 67 is made of metal or a ceramic material. The retainer 68 is made of resin. The retainer 68 is located between the first rail member 26 and the second rail member 74 in the direction of the Z axis. The retainer 68 includes a plurality of spherical-object holding holes 68a that hold the spherical objects 67 so as to be rollable, respectively. In the present example, the rotational support structure 12 includes six spherical objects 67. The retainer 68 includes six spherical-object holding holes 68a provided at equal angular intervals. The spherical object 67 is held to be rollable inside the spherical-object holding hole 68a, and protrudes in the −Z direction and the +Z direction from the retainer 68.

Each of the pair of plate roller extension portions 71 includes a first portion of the plate roller extension portion 77 extending from the annular plate portion 75 in the direction of the first axis R1, a second portion of the plate roller extension portion 78 extending the first portion of the plate roller extension portion 77 and the outer circumference side of the movable body 10 toward the direction of the Z axis, and a third portion of the plate roller extension portion 79 connecting the first portion of the plate roller extension portion 77 and the second portion of the plate roller extension portion 78. The third portion of the plate roller extension portion 79 is bent in the −Z direction toward the direction away from the annular plate portion 75 in the direction of the first axis R1.

The first portion of the plate roller extension portion 77 is wider in the circumferential direction than the third portion of the plate roller extension portion 79 and the second portion of the plate roller extension portion 78. When viewed from the direction of the Z axis, steps 80 are provided on both sides in the circumferential direction between the first portion of the plate roller extension portion 77 and the third portion of the plate roller extension portion 79.

As illustrated in FIG. 6, the second portion of the plate roller extension portion 78 faces the movable body 10 with a slight gap on the outside of the movable body 10 in the direction of the first axis R1. As illustrated in FIGS. 6, 13 and 14, a gimbal frame receiving member 83 is fixed to each of the second portions of the plate roller extension portion 78 opposite to the movable body 10. As illustrated in FIG. 4, each of the gimbal frame receiving members 83 includes a spherical object 84 located on the outer circumference side (opposite side of the movable body 10) of each of the second portions of the plate roller extension portion 78, and a thrust receiving member 85 fixed to the second portion of the plate roller extension portion 78 on the outer circumference side.

The thrust receiving member 85 fixed to the second portion of the plate roller extension portion 78 supports the spherical object 84 at a position separated from the second portion of the plate roller extension portion 78 on the first axis R1.

Figure 15A:
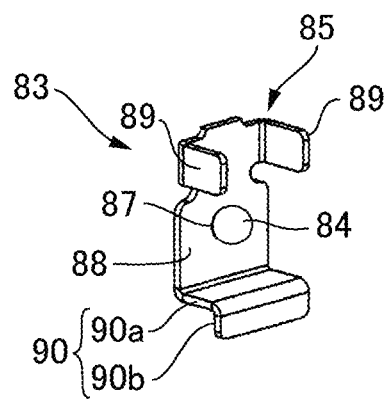
FIGS. 15A and 15B are perspective views of a gimbal frame receiving member.
Figure 15B:
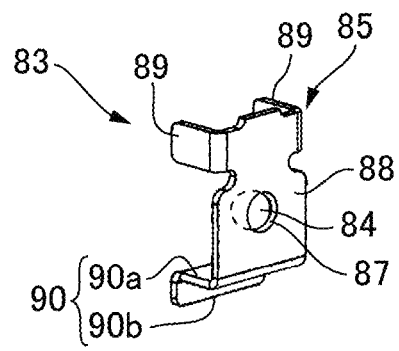

FIGS. 15A and 15B are perspective views of the gimbal frame receiving member. FIG. 15A is a perspective view of the gimbal frame receiving member 83 when viewed from the side where the spherical object 84 is located. FIG. 15B is a perspective view of the gimbal frame receiving member 83 when viewed from the side opposite to the side where the spherical object 84 is located. As illustrated in FIGS. 15A and 15B, the thrust receiving member 85 includes a plate 88 having a spherical object fixing portion 87 to which the spherical object 84 is fixed, a pair of arms 89 protruding to the side where the spherical object 84 is fixed from both ends in the circumferential direction in the +Z direction of the plate 88 from the spherical object fixing portion 87, and a foot 90 protruding from the end of the plate 88 in the −Z direction to the side where the spherical object 84 is fixed.

The plate 88 has a rectangular shape that is long in the direction of the Z axis as a whole. The spherical object fixing portion 87 is a circular through-hole provided in the plate 88. The inner diameter of the through-hole is smaller than the diameter of the spherical object 84. The spherical object 84 is fixed to the thrust receiving member 85 by welding while being partially inserted into the spherical object fixing portion 87. The foot 90 includes a protruding foot plate 90a protruding in a direction orthogonal to the annular plate portion 75 from the end of the plate 88 in the −Z direction, and a bent foot plate 90b bending in the −Z direction from the end of the protruding foot plate 90a on the side opposite to the plate 88. As illustrated in FIGS. 13 and 14, the gimbal frame receiving member 83 is fixed to the distal end of each of the arms 89 of the thrust receiving member 85, and the bent foot plate 90b is fixed to the second portion of the plate roller extension portion 78 by welding.

As illustrated in FIG. 9, the pressurization structure 69 includes a first magnetic component 91, a second magnetic component 92, a third magnetic component 93, and a fourth magnetic component, which are fixed at four locations in the circumferential direction of the plate roller 66, respectively. More specifically, the pressurization structure 69 includes the first magnetic component 91 fixed to one of the first portions of plate roller extension portion 77, and the second magnetic component 92 fixed to the other of the first portions of the plate roller extension portion 77. Further, the pressurization structure 69 includes the third magnetic component 93 fixed to one of the plate roller protruding portions 76, and a fourth magnetic component 94 fixed to the other of the plate roller protruding portions 76. The first magnetic component 91, the second magnetic component 92, the third magnetic component 93, and the fourth magnetic component 94 are the same component.

As illustrated in FIG. 13, the shape of each of the magnetic components 91 to 94 when viewed from the direction of the Z axis is symmetrical with respect to a virtual line M, which extends in the radial direction at the center in the circumferential direction. Further, each of the magnetic components 91 to 94 includes a wide portion 95 having a width in the radial direction wider than both ends in the circumferential direction at the center in the circumferential direction. The width of each of the magnetic components 91 to 94 in the radial direction gradually increases from both of the ends toward the wide portion 95. In the present example, each of the magnetic components 91 to 94 includes a rectangular portion 96 that is long in the circumferential direction and has a rectangular shape, and a trapezoidal portion 97 that is tapered inward in the radial direction from an edge on the inner circumferential side of the rectangular portion 96.

The first magnetic component 91 and the second magnetic component 92 are fixed to the plate roller extension portion 71 in the +Z direction (the side opposite to the holder end plate portion 33 in the direction of the Z axis). The third magnetic component 93 and the fourth magnetic component 94 are fixed to the plate roller protruding portion 76 in the +Z direction (the side opposite to the holder end plate portion 33 in the direction of the Z axis).

When a state in which the first magnetic component 91 and the second magnetic component 92 are fixed to the first portion of the plate roller extension portion 77 is viewed from the direction of the Z axis, both edges of the first magnetic component 91 and the second magnetic component 92 in the circumferential direction overlap with both edges of the first portion of the plate roller extension portion 77 in the circumferential direction. Further, a portion of the edge of the outer circumference side of the first magnetic component 91 and the second magnetic component 92 overlaps with the contour of the step 80 of the plate roller extension portion 71. Further, when a state in which the third magnetic component 93 and the fourth magnetic component 94 are fixed to the plate roller protruding portion 76 is viewed from the direction of the Z axis, both edges of the third magnetic component 93 and the fourth magnetic component 94 in the circumferential direction overlap with both edges of the plate roller protruding portion 76 in the circumferential direction. Further, the edge of the outer circumferential side of the third magnetic component 93 and the fourth magnetic component 94 overlap with the edge of the outer circumferential side of the plate roller protruding portion 76. That is, the shape of each of the first portions of the plate roller extension portion 77 functions as a positioning portion for positioning the first magnetic component 91 and the second magnetic component 92 in the circumferential direction and the radial direction. Further, the shape of the plate roller protruding portion 76 functions as a positioning portion for positioning the third magnetic component 93 and the fourth magnetic component 94 in the circumferential direction and the radial direction.

Further, as illustrated in FIGS. 6, 7, and 13, the pressurization structure 69 includes four magnets 56 to 59 fixed to the holder end plate portion 33 of the holder 25 of the movable body 10. Each of the four magnets 56 to 59 is arranged at the same angular position when the movable body 10 and the plate roller annular portion 70 of the plate roller 66 are overlapped with each other. That is, each of the magnets 56 to 59 overlaps with each of the four magnetic components 91 to 94 when viewed from the direction of the Z axis.

Here, as illustrated in FIG. 10, the notch 48 provided on one side of the board 47 of the stopper mechanism 27 in the direction of the first axis R1 serves as a first positioning portion for arranging the first magnet 56 at a position overlapping with the first magnetic component 91 when viewed from the direction of the Z axis. The notch 48 provided on the other side of the board 47 of the stopper mechanism 27 in the direction of the first axis R1 serves as a second positioning portion for arranging the second magnet 57 at a position overlapping with the second magnetic component 92 when viewed from the direction of the Z axis. The notch 48 provided on one side of the board 47 of the stopper mechanism 27 in the direction of the second axis R2 serves as a third positioning portion for arranging the third magnet 58 at a position overlapping with the third magnetic component 93 when viewed from the direction of the Z axis. The notch 48 provided on the other side of the board 47 of the stopper mechanism 27 in the direction of the second axis R2 serves as a fourth positioning portion for arranging the fourth magnet 59 at a position overlapping with the fourth magnetic component 94 when viewed from the direction of the Z axis.

The magnets 56 to 59 attract the magnetic components 91 to 94 that overlap with the respective magnets 56 to 59 in the direction of the Z axis, respectively. Accordingly, the pressurization structure 69 applies a force for bringing the first annular groove 45 and the second annular groove 65 closer to each other in the direction of the Z axis at four positions at equal angular intervals around the optical axis L. The movable body 10 is attracted to the plate roller 66 by the magnetic attraction force between each of the magnetic components 91 to 94 of the pressurization structure 69 and each of the magnets 56 to 59, and is supported by the plate roller 66 in a state of being rotatable around the Z axis.

Here, as illustrated in FIG. 9, when the movable body 10 is supported by the plate roller 66 in a state of being rotatable around the Z axis, the first bent portion 49 of the stopper mechanism 27 has a first-side stopper part 49a that faces one of the plate roller extension portions 71 with a gap from one side in the circumferential direction. The first-side stopper part 49a is an edge on one side of the first bent portion 49 in the circumferential direction. Further, the first bent portion 49 of the stopper mechanism 27 includes a second-side stopper part 49b that faces one of the plate roller protruding portions 76 with a gap from the other side in the circumferential direction. The second-side stopper part 49b is an edge on the other side of the first bent portion 49 in the circumferential direction.

Further, the movable body 10 includes a second stopper mechanism 98 fixed to the stopper mechanism 27. As illustrated in FIG. 10, the second stopper mechanism 98 includes an annular stopper part 99 surrounding the optical axis, a first connecting part 100 with a substantially rectangular shape protruding from the stopper part 99 in the +X direction, a second connecting part 101 protruding from the stopper part 99 in the −Y direction, and a third connecting part 102 protruding from the stopper part 99 in the +Y direction. In the second stopper mechanism 98, the first connecting part 100 is connected to the end of the first bent portion 49 of the stopper mechanism 27 in the +Z direction, the second connecting part 101 is connected to the end of the second bent portion 50 of the stopper mechanism 27 in the +Z direction, the third connecting part 102 is connected to the end of the third bent portion 51 of the stopper mechanism 27 in the +Z direction, and these are fixed by welding.

As illustrated in FIGS. 6 and 7, when the second stopper mechanism 98 is fixed to the stopper mechanism 27, the stopper part 99 faces the plate roller annular portion 70 with a predetermined gap from the direction of the Z axis on the side opposite to the second annular groove 65 of the plate roller annular portion 70 in the direction of the Z axis. The stopper part 99 prevents the movable body 10 from falling out from the plate roller 66 in the −Z direction.

Fixed Body

As illustrated in FIG. 8, the fixed body 11 includes a case 105 with a frame shape that surrounds the movable body 10 and the rotational support structure 12 from the outer circumference side. As illustrated in FIG. 1, the cover 4 covers the case 105 from the +Z direction. As illustrated in FIG. 3, the base 5 closes an opening of the case 105 in the −Z direction. The case 105, the cover 4, and the base 5 are made of metal. The cover 4 and the base 5 are fixed to the case 105 by welding.

The case 105 is made of non-magnetic metal. As illustrated in FIG. 8, the case 105 includes a frame plate portion 106 that surrounds the holder 25 from the outside in the radial direction, and a fixed body-side flange portion 107 that bends from the end of the frame plate portion 106 in the −Z direction and protrudes toward the outer circumference side. The frame plate portion 106 is oriented toward the thickness direction in the radial direction. The base 5 is fixed to the fixed body-side flange portion 107.

The frame plate portion 106 includes a first frame plate portion 111 extending toward the direction of the Y axis in the −X direction of the movable body 10, a second frame plate portion 112 extending toward the direction of the Y axis in the +X direction of the movable body 10, a third frame plate portion 113 extending toward the direction of the X axis in the −Y direction of the movable body 10, and a fourth frame plate portion 114 extending toward the direction of the X axis in the +Y direction of the movable body 10. In the frame plate portion 106, the second frame plate portion 112 and the third frame plate portion 113 are connected to each other by a fifth frame plate portion 115, which is inclined by 45 degree with respect to the second frame plate portion 112 and the third frame plate portion 113. In the frame plate portion 106, the first frame plate portion 111 and the fourth frame plate portion 114 are connected to each other by a sixth frame plate portion 116, which is inclined by 45 degree with respect to the first frame plate portion 111 and the fourth frame plate portion 114. The fifth frame plate portion 115 and the sixth frame plate portion 116 face each other in the direction of the second axis R2. The fifth frame plate portion 115 and the sixth frame plate portion 116 have a rectangular notch portion 106a at the end in the +Z direction. That is, the case 105 includes, in the edge in the +Z direction, the notch portion 106a in a portion overlapping with the second axis R2 when viewed from the direction of the Z axis.

The first frame plate portion 111 and the third frame plate portion 113 are connected by a seventh frame plate portion 117, which protrudes outward in the direction of the first axis R1. Therefore, the first frame plate portion 111 is offset from the seventh frame plate portion 117 in the +X direction. Further, the third frame plate portion 113 is offset from the seventh frame plate portion 117 in the +Y direction. The seventh frame plate portion 117 has a bent shape in which the direction of the first axis R1 protrudes toward the outer circumference side, then extends in the circumferential direction, and the direction of the first axis R1 bends toward the inner circumferential side. The fourth frame plate portion 114 and the second frame plate portion 112 are connected to each other by an eighth frame plate portion 118, which protrudes outward from the fourth frame plate portion 114 in the direction of the first axis R1. The fourth frame plate portion 114 is offset from the eighth frame plate portion 118 in the −Y direction. When viewed from the direction of the Z axis, the eighth frame plate portion 118 protrudes outward from the fourth frame plate portion 114 in the direction of the first axis R1, then extends in the circumferential direction, and is connected to the second frame plate portion 112.

A notch 112a with a rectangular shape is provided at an edge of the second frame plate portion 112 in the −Z direction. Here, a flexible printed board (not illustrated) is drawn out from the camera module 2 in the +X direction. The flexible printed board is drawn out to the outside of the case 105 via the notch 112a.

The gimbal frame receiving members 83 are fixed to an outer end face of the fifth frame plate portion 115 and an outer end face of the sixth frame plate portion 116, respectively. Each of the gimbal frame receiving members 83 is the same member as the gimbal frame receiving member 83 fixed to the second portion of the plate roller extension portion 78. Each of the gimbal frame receiving members 83 includes the spherical object 84 located on the outer circumference side of the frame plate portion 106 (on the side opposite to the movable body 10), and the thrust receiving member 85 that is fixed to the frame plate portion 106 on the outer circumference side and supports the spherical object 84 at a position separated from the frame plate portion 106 on the second axis R2. In each of the gimbal frame receiving members 83, the distal end of each of the arms 89 of the thrust receiving member 85 and the bent foot plate 90*b* are fixed by welding to the fifth frame plate portion 115 and the sixth frame plate portion 116, respectively.

A first shake-correction coil 121 is fixed to an outer surface of the first frame plate portion 111 (a surface on the side opposite to the movable body 10). A second shake-correction coil 122 is fixed to the outer surface of the third frame plate portion 113. Further, two rolling corrective coils 123 and 124 are fixed to the outer side surface of the fourth frame plate portion 114. The two rolling corrective coils 123 and 124 are arranged in the circumferential direction. Here, as illustrated in FIG. 3, the flexible printed board 9 is routed along the first frame plate portion 111, the second frame plate portion 112, and the fourth frame plate portion 114 on the outer circumference side of the first shake-correction coil 121, the second shake-correction coil 122, and the two rolling corrective coils 123 and 124. The first shake-correction coil 121, the second shake-correction coil 122, and the two rolling corrective coils 123 and 124 are electrically connected to the flexible printed board 9.

An oscillation position sensor 130 of the shake corrective-magnet drive structure 20 is provided on the flexible printed board 9. As illustrated in FIG. 8, the oscillation position sensor 130 includes a first Hall element 131 arranged at a position overlapping with the opening of the first shake-correction coil 121, and a second Hall element 132 arranged at a position overlapping with the opening of the second shake-correction coil 122, when viewed from the radial direction. The oscillation position sensor 130 detects an oscillation angle around the X axis of the movable body 10 on the basis of the output of the second Hall element 132 disposed at a position overlapping with the opening of the second shake-correction coil 122. Further, the oscillation position sensor 130 detects the oscillation angle around the Y axis of the movable body 10 on the basis of the output of the first Hall element 131 disposed at a position overlapping with the opening of the first shake-correction coil 121.

Further, the flexible printed board 9 is provided with a rotational position sensor 135 of the rolling corrective-magnet drive structure 23. The rotational position sensor 135 includes a Hall element 136 that overlaps with the opening of the rolling corrective coils 123 when viewed from the radial direction. The rotational position sensor 135 detects the angular position of the movable body 10 around the Z axis based on the output of the Hall element 136.

Further, as illustrated in FIG. 3, in the flexible printed board 9, a first magnetic plate 137 with a rectangular shape is fixed on the outer circumference side of the first shake-correction coil 121. Further, in the flexible printed board 9, a second magnetic plate 138 with a rectangular shape is disposed on the outer circumference side of the second shake-correction coil 122.

Gimbal Frame

Figure 16:
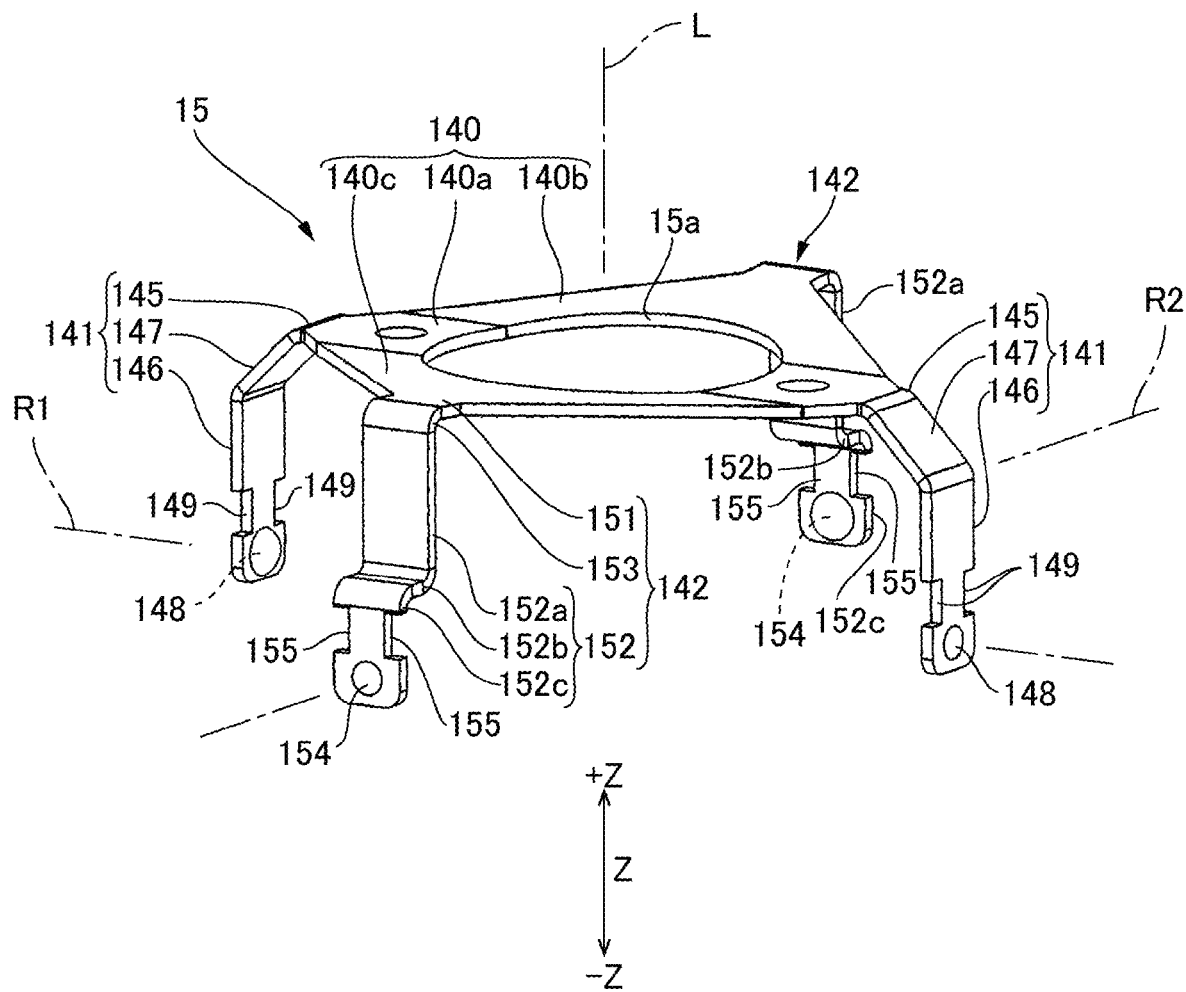
FIG. 16 is a perspective view of a gimbal frame.

FIG. 16 is a perspective view of the gimbal frame 15. The gimbal frame 15 is made of a metal leaf spring. As illustrated in FIG. 8, the gimbal frame 15 includes a main body 140 located in the +Z direction of the plate roller 66, a pair of first axis-side extension parts 141 that protrude from the main body 140 toward both sides in the direction of the first axis R1 and extends in the −Z direction, and a pair of second axis-side extension parts 142 that protrude from the main body 140 toward both sides in the direction of the second axis R2 and extends in the −Z direction. As illustrated in FIG. 14, the main body 140 includes a central portion 140*a* with a substantially rectangular shape that extends in the direction of the first axis R1, a first inclined portion 140*b* that is inclined in the +Z direction from one side of the central portion 140*a* in the direction of the second axis R2 (−Y direction side) toward the outer circumference side, and a second inclined portion 140*c* that is inclined in the +Z direction from the other side of the central portion 140*a* in the direction of the second axis R2 (+Y direction side) toward the outer circumference side. Further, the main body 140 includes an opening 15*a*, which penetrates in the direction of the Z axis in the center. As illustrated in FIG. 8, the camera module cylindrical portion 31 of the camera module 2 is located inside the opening 15*a* when viewed from the direction of the Z axis.

As illustrated in FIG. 16, each of the pair of first axis-side extension parts 141 includes a first portion of the first axis-side extension part 145 that extends in a direction away from the main body 140 in the direction of the first axis R1, a second portion of the first axis-side extension part 146 that extends the outer circumference side of the first portion of the first axis-side extension part 145 and the movable body 10 in the direction of the Z axis, and a third portion of the first axis-side extension part 147 that connects the first portion of the first axis-side extension part 145 and the second portion of the first axis-side extension part 146.

The first portion of the first axis-side extension part 145 protrudes from the central portion 140*a* in the direction of the first axis R1. The third portion of the first axis-side extension part 147 is inclined in the −Z direction from the leading edge of the first portion of the first axis-side extension part 145 toward the outer circumference side. The second portion of the first axis-side extension part 146 includes a first axis-side recessed curved surface 148 that recesses the direction of the first axis R1 in the inner circumference side toward the side of the movable body 10 on the first axis R1. Further, the second portion of the first axis-side extension part 146 includes a pair of rectangular notches 149 formed by cutting out edges on both ends in the circumferential direction in the +Z direction of the first axis-side recessed curved surface 148. By providing the pair of notches 149, the second portion of the first axis-side extension part 146 is provided with a portion having a narrow width in the circumferential direction in the +Z direction of the first axis-side recessed curved surface 148.

Next, each of the pair of second axis-side extension parts 142 includes a first portion of the second axis-side extension part 151 that extends in a direction away from the main body 140 in the direction of the second axis R2, a second portion of the second axis-side extension part 152 that extends the outer circumference side of the first portion of the second axis-side extension part 151 and the movable body 10 in the direction of the Z axis, and a third portion of the second axis-side extension part 153 that connects the first portion of the second axis-side extension part 151 and the second portion of the second axis-side extension part 152.

The pair of first portions of the second axis-side extension part 151 protrude in the direction of the second axis R2 from the respective edges of the outer circumference sides of the first inclined portion 140b and the second inclined portion 140c. The third portion of the second axis-side extension part 153 bends in the −Z direction from the edge of the outer circumferential side of the first portion of the second axis-side extension part 151. The second portion of the second axis-side extension part 152 includes a first portion 152a that extends the outside of the movable body 10 in the direction of the second axis R2 from the third portion of the second axis-side extension part 153 toward the direction of the Z axis, a bent portion 152b that bends outward in the radial direction from the edge of the first portion 152a in the −Z direction, and a second portion 152c that extends toward the −Z direction from the edge of the outer circumferential side of the bent portion 152b. The second portion 152c includes a second axis-side recessed curved surface 154 that recesses the direction of the second axis R2 in the inner circumferential side toward the movable body 10 on the second axis R2. Further, the second portion 152c includes a pair of rectangular notches 155 formed by cutting out edges at both ends in the circumferential direction in the +Z direction of the second axis-side recessed curved surface 154. By providing the pair of notches 155, the second portion 152c includes a portion having a narrow width in the circumferential direction in the +Z direction of the second axis-side recessed curved surface 154.

Assembly of Optical Unit with Shake-Correction Function

Figure 17:
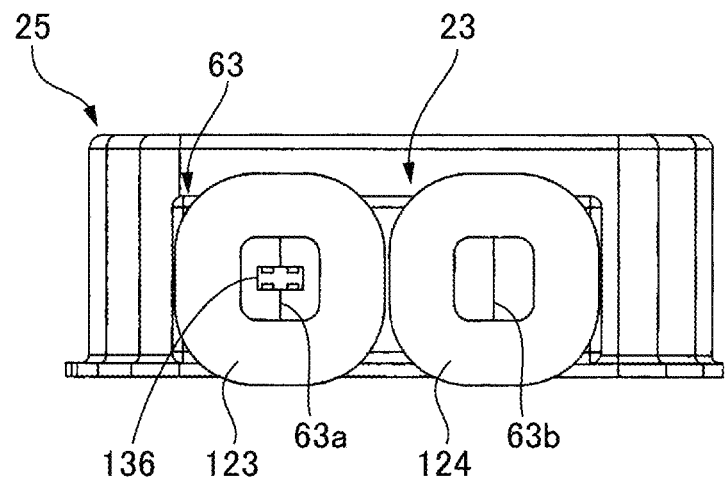
FIG. 17 is an explanatory diagram of a rolling drive structure.

FIG. 17 is an explanatory view of the rolling corrective-magnet drive structure 23 when viewed from the outside in the radial direction. In FIG. 17, the fourth frame plate portion 114 of the case 105 located between the rolling corrective magnet 63 and the two rolling corrective coils 123 and 124 is omitted.

When assembling the optical unit 1 with shake-correction function, as illustrated in FIG. 8, the second portion of the first axis-side extension part 146 of each of the first axis-side extension parts 141 of the gimbal frame 15 is inserted between the respective gimbal frame receiving members 83 fixed to both sides in the direction of the first axis R1 of the plate roller 66 and the plate roller 66. Then, as illustrated in FIG. 6, the first axis-side recessed curved surface 148 provided on each of the second portions of the first axis-side extension part 146 is set in a state of being in contact with the spherical object 84 of each of the gimbal frame receiving members 83. Accordingly, the first connecting mechanism 16 that connects the rotational support structure 12 and the gimbal frame 15 around the first axis R1 is configured. Further, at this time, set is a state in which the pair of arms 89 of the thrust receiving member 85 of each of the gimbal frame receiving members 83 are inserted into the pair of notches 149 provided on each of the second portions of the first axis-side extension part 146. This prevents the gimbal frame 15 from falling out from the gimbal frame receiving members 83 located on both sides in the direction of the first axis R1 toward the +Z direction.

Here, when the first axis-side recessed curved surface 148 of each of the first axis-side extension parts 141 is brought into contact with the spherical object 84 of each of the gimbal frame receiving members 83 on both sides in the direction of the first axis R1, the pair of first axis-side extension parts 141 are bent toward the inner circumference side of each other. Therefore, the second portion of the first axis-side extension part 146 is urged toward the outer circumference side, so that an urging force from the first axis-side extension part 141 acts on the gimbal frame receiving member 83 fixed to the plate roller 66 via the spherical object 84. Accordingly, the first axis-side recessed curved surface 148 of each of the first axis-side extension parts 141 and the spherical object 84 of each of the gimbal frame receiving members 83 can be maintained with a state of being in contact with each other.

Next, as illustrated in FIG. 4, the second portions 152c of each of the second axis-side extension parts 142 is inserted between the respective gimbal frame receiving members 83 fixed to both sides in the direction of the second axis R2 of the case 105 and the case 105. Then, as illustrated in FIG. 7, the second axis-side recessed curved surface 154 provided on each of the second portions 152c is set in a state of being in contact with the spherical object 84 of each of the gimbal frame receiving members 83. Accordingly, the second connecting mechanism 17 that connects the fixed body 11 and the gimbal frame 15 around the second axis R2 is configured. Further, at this time, set is a state in which the pair of arms 89 of the thrust receiving member 85 of each of the gimbal frame receiving members 83 are inserted into the pair of notches 155 provided in each of the second portions 152c. This prevents the gimbal frame 15 from falling out from the gimbal frame receiving members 83 located on both sides in the direction of the second axis R2 toward the +Z direction.

Here, when the second axis-side recessed curved surface 154 of each of the second axis-side extension parts 142 is brought into contact with the spherical object 84 of each of the gimbal frame receiving members 83 on both sides in the direction of the second axis R2, the pair of second axis-side extension parts 142 are bent toward the inner circumference side of each other. Therefore, the second portion 152c is urged toward the outer circumference side, so that an urging force from the second axis-side extension part 142 acts on each of the gimbal frame receiving members 83 fixed to the case 105 via the spherical object 84. Accordingly, the second axis-side recessed curved surface 154 of each of the second axis-side extension parts 142 and the spherical object 84 of each of the gimbal frame receiving members 83 can be maintained with a state of being in contact with each other.

In the state in which the second connecting mechanism 17 is configured, as illustrated in FIGS. 4 and 7, in the second portion of the second axis-side extension part 152 of each of the second axis-side extension parts 142 of the gimbal frame 15, the bent portion 152b is disposed inside the pair of notch portions 106a provided at both ends of the second axis R2 of the case 105 of the fixed body 11. Therefore, in the second portion of the second axis-side extension part 152, the first portion 152a extends toward the direction of the Z axis on the outer side of the movable body 10 in the direction of the second axis R2 on the inner circumferential side of the frame plate portion 106. The bent portion 152b overlaps with the frame plate portion 106 of the case 105 when viewed from the direction of the Z axis. The second portion 152c extends in the direction of the Z axis on the outer side of the frame plate portion 106 in the direction of the second axis R2.

As illustrated in FIG. 4, when the gimbal mechanism 13 is configured, the movable body 10 and the rotational support structure 12 are in a state of being disposed inside the case 105. When the gimbal mechanism 13 is configured, the movable body 10 is supported by the case 105 via the gimbal mechanism 13 and the rotational support structure 12. As a result, the movable body 10 can oscillate around an intersection P at which the optical axis L, the first axis R1, and the second axis R2 intersect with one another. As illustrated in FIGS. 6 and 7, the intersection P is positioned inside the camera module 2.

When the gimbal mechanism 13 is configured, as illustrated in FIG. 5, the first shake corrective magnet 61 and the first shake-correction coil 121 face each other in the direction of the X axis in a state where the first frame plate portion 111 is interposed therebetween. The first shake corrective magnet 61 and the first shake-correction coil 121 constitute the first shake corrective-magnet drive structure 21. Therefore, the movable body 10 rotates around the Y axis due to the power supply to the first shake-correction coil 121. Further, the second shake corrective magnet 62 and the second shake-correction coil 122 face each other in the direction of the X axis in a state in which the third frame plate portion 113 is interposed therebetween. The second shake corrective magnet 62 and the second shake-correction coil 122 constitute the second shake corrective-magnet drive structure 22. Therefore, the movable body 10 rotates around the X axis due to the power supply to the second shake-correction coil 122. The shake corrective-magnet drive structure 20 rotates the movable body 10 around the first axis R1 and the second axis R2 by combining the rotation of the movable body 10 around the Y axis by the first shake corrective-magnet drive structure 21 with the rotation of the movable body 10 around the X axis by the second shake corrective-magnet drive structure 22.

Further, when the gimbal mechanism 13 is configured, the rolling corrective magnet 63 and the two rolling corrective coils 123 and 124 face each other in the direction of the Y axis in a state where the fourth frame plate portion 114 is interposed therebetween. The rolling corrective magnet 63 and the two rolling corrective coils 123 and 124 constitute the rolling corrective-magnet drive structure 23. Therefore, the movable body 10 rotates around the Z axis due to the power supply to the two rolling corrective coils 123 and 124.

Here, when the state in which the gimbal mechanism 13 is configured is viewed from the radial direction, the magnetic polarization line 61a of the first shake corrective magnet 61 extending in the circumferential direction and the opening of the first shake-correction coil 121 overlap with each other. Therefore, the pair of coil portions extending in the circumferential direction in the first shake-correction coil 121 serves as an effective side for exerting a driving force around the Y axis. Further, the first shake corrective magnet 61 and the first magnetic plate 137 overlaps with each other. The first shake corrective magnet 61 and the first magnetic plate 137 constitute a magnetic spring for returning the movable body 10 to a reference angular position in the rotation direction around the Y axis. Further, the first Hall element 131 of the oscillation position sensor 130 and the magnetic polarization line 61a of the first shake corrective magnet 61 overlap with each other. Therefore, the oscillation position sensor 130 can acquire the angular position in the rotational direction around the Y axis based on the output from the first Hall element 131.

Further, the magnetic polarization line 62a of the second shake corrective magnet 62 extending in the circumferential direction overlaps with the opening of the second shake-correction coil 122. Therefore, the pair of coil portions extending in the circumferential direction in the second shake-correction coil 122 serves as an effective side to exert a driving force to the movable body 10 around the X axis. Further, the second shake corrective magnet 62 and the second magnetic plate 138 overlaps with each other. The second shake corrective magnet 62 and the second magnetic plate 138 constitute a magnetic spring for returning the movable body 10 to the reference angular position in the rotation direction around the X axis. Further, the second Hall element 132 of the oscillation position sensor 130 and the magnetic polarization line 62a of the second shake corrective magnet 62 overlap with each other. Therefore, the oscillation position sensor 130 can acquire the angular position in the rotational direction around the X axis based on the output from the second Hall element 132.

Further, as illustrated in FIG. 17, the first magnetic polarization line 63a of the rolling corrective magnet extending in the direction of the Z axis overlaps with the opening of the rolling corrective coil 123. Further, the second magnetic polarization line 63b of the rolling corrective magnet extending in the direction of the Z axis overlaps with the opening of the other rolling corrective coil 124. Therefore, in each of the rolling corrective coils 123 and 124, the pair of coil portions extending in the direction of the X axis serves as an effective side that exerts a driving force for rotating the movable body 10 around the Z axis. Further, the Hall element 136 of the rotational position sensor 135 overlaps with the first magnetic polarization line 63a. Therefore, the rotational position sensor 135 can acquire the angular position in the rotational direction around the X axis based on the output from the Hall element 136.

Next, the cover 4 covers the case 105 from the direction of the Z axis, and these are fixed by welding. As illustrated in FIGS. 1, 2, and 7, when the state in which the cover 4 is fixed to the case 105 is viewed from the +Z direction, in the object-side end plate portion 8 of the cover 4, the portions located at both ends in the direction of second axis R2 and the bent portions 152b of the gimbal frame 15 face each other in the direction of the Z axis. Accordingly, the object-side end plate portion 8 serves as a retaining portion for preventing the gimbal frame 15 and the movable body 10 from falling out from the fixed body 11 toward the +Z direction in the direction of the Z axis.

Function and Effect

According to the present examples, the rotational support structure 12, which supports the movable body 10 to be rotatable around the Z axis, is rotatably supported by the gimbal mechanism 13 around the first axis R1 and the second axis R2. Therefore, even in a state where the movable body 10 rotates around the first axis R1 or the second axis R2, it is possible to rotate the movable body 10 around the rotation axis that coincides with the optical axis L. Further, the rotational support structure 12 includes the plurality of spherical objects 84 that are inserted into the first annular groove 45 provided on the movable body 10 and the second annular groove 65 provided on the plate roller 66 and roll. Therefore, as compared to a case where the movable body 10 is supported to be rotatable by a plurality of leaf springs, the rotation axis of the movable body 10 does not become unstable.

Further, the rolling corrective-magnet drive structure 23, which rotates the movable body 10 around the Z axis, is polarized and magnetized in the circumferential direction, and includes the rolling corrective magnet including the first magnetic polarization line 63a and the second magnetic polarization line 63b which extend in parallel in the Z axis direction, and the two rolling corrective coils 123 and 124. Further, the two rolling corrective coils 123 and 124 are arranged in the circumferential direction around the Z axis. When viewed from the radial direction centered on the optical axis L, the first magnetic polarization lines 63a overlaps with the opening of the rolling corrective coil 123, and the second magnetic polarization line 63b overlaps with the opening of the other rolling corrective coil 124. Therefore, as compared to the case where the rolling corrective-magnet drive structure 23 includes one rolling corrective coil, it is easy to exert a large driving force by the rolling corrective-magnet drive structure 23. In other words, when the rolling corrective-magnet drive structure 23 includes the two rolling corrective coils 123 and 124, it is possible to exert a predetermined driving force even when the length of the effective side of each of the rolling corrective coils 123 and 124 is shortened, as compared with the case where the rolling corrective-magnet drive structure 23 includes one rolling corrective coil. Here, the effective side of each of the rolling corrective coils 123 and 124 extends in the direction in which the magnetic polarization lines 63a and 63b of the rolling corrective magnet 63 extend. Therefore, it is possible to reduce the size of each of the rolling corrective coils in the direction of the Z axis. As a result, it is possible to prevent the fixed body 11 from becoming large in the direction of the Z axis.

Further, in the present examples, the movable body 10 includes the holder 25 having the holder frame portion 32 which surrounds the camera module 2 from the outer circumference side. The fixed body 11 includes the case 105 which surrounds the holder frame portion 32 from the outer circumference side. The rolling corrective magnet 63 is fixed to the holder frame portion 32, and the two rolling corrective coils 123 and 124 are fixed to the case 105 on the side opposite to the rolling corrective magnet 63. Therefore, it is possible to prevent the rolling corrective magnet 63 from coming into contact with each of the rolling corrective coils, and prevent each of the rolling corrective coils from being disconnected.

That is, when the rolling corrective-magnet drive structure 23 includes the two rolling corrective coils 123 and 124 arranged in the circumferential direction, the rolling corrective-magnet drive structure 23 is likely to be large in the circumferential direction, as compared with the case where the rolling corrective-magnet drive structure 23 includes one rolling corrective coil. When the rolling corrective-magnet drive structure 23 enlarges in the circumferential direction, the end of the rolling corrective magnet 63 fixed to the movable body 10 in the circumferential direction and each of the rolling corrective magnets 63 fixed to the fixed body 11 approach each other when the movable body 10 rotates. Therefore, in case that the two rolling corrective coils 123 and 124 are fixed to the case 105 and face the rolling corrective magnet 63, when the movable body 10 rotates around the Z axis, there is a possibility that the end on one side of the rolling corrective magnet 63 in the circumferential direction contact with the rolling corrective coil located on one side in the circumferential direction, and each of the rolling corrective magnets 63 are disconnected. On the other hand, when the two rolling corrective coils 123 and 124 are fixed to the case 105 on the side opposite to the rolling corrective magnet 63, it is possible to prevent the rolling corrective magnet 63 from coming into contact with each of the rolling corrective coils, and prevent each of the rolling corrective coils from being disconnected.

Further, when the two rolling corrective coils 123 and 124 are fixed to the case 105 on the side opposite to the rolling corrective magnet 63, the case 105 is interposed between the two rolling corrective coils 123 and 124 and the rolling corrective magnet 63. Therefore, the two rolling corrective coils 123 and 124 and the rolling corrective magnet 63 is likely to be spaced apart from each other in the radial direction. On the other hand, the rolling corrective-magnet drive structure 23 includes the two rolling corrective coils 123 and 124. Therefore, even when the two rolling corrective coils 123 and 124 are separated from the rolling corrective magnet 63, it is possible to secure the driving force by the rolling corrective-magnet drive structure 23.

Further, in the present examples, the holder 25 is made of magnetic metal, and the case 105 is made of non-magnetic metal. When the holder 25 is made of magnetic metal, the holder 25 functions as a yoke of the rolling corrective magnet 63. Therefore, it is easy to ensure the driving force of the rolling corrective-magnet drive structure 23. Further, when the case 105 is made of non-magnetic metal, it is easy to thin the case 105 in the radial direction, as compared with the case where the case 105 is made of resin. Accordingly, even when the case 105 is interposed between the rolling corrective magnet 63 and the rolling drive coil, it is possible to bring the rolling corrective magnet 63 and the rolling drive coil closer to each other in the radial direction. Therefore, it is easy to ensure the driving force of the rolling corrective-magnet drive structure 23.

Further, the rotational support structure 12 includes the first annular groove 45 provided on the movable body 10 in a state of being coaxial with the optical axis L, the plate roller 66 having the second annular groove 65 facing the first annular groove in the direction of the Z axis, the plurality of spherical objects 84 which are inserted into the first annular groove 45 and the second annular groove 65 and rolls between the movable body 10 and the plate roller 66, and the pressurization structure 69 for applying a force to approach the first annular groove 45 and the second annular groove 65 each other in the direction of the Z axis. The gimbal mechanism 13 rotatably supports the plate roller 66 around the first axis R1. The plate roller 66 is non-magnetic. The pressurization structure 69 includes each of the magnetic components 91 to 94 fixed to a portion of the plate roller 66 in the circumferential direction around the Z axis, and each of the magnets 56 to 59 which is fixed to a portion of the movable body 10 in the circumferential direction and attracts each of the magnetic components 91 to 94. In such a configuration, each of the magnetic components 91 to 94 and each of the magnets 56 to 59 constituting the pressurization structure 69 is provided on a portion in the circumferential direction around the Z axis. Therefore, when each of the magnetic components 91 to 94 is attracted to each of the magnets 56 to 59, the angular position of the movable body 10 with respect to the plate roller 66 is defined around the Z axis. Accordingly, it is possible to define a reference angular position of the movable body 10 around the Z axis by the pressurization structure 69.

Further, in the present examples, the rotational position sensor 135, which detects the angular position of the movable body 10, includes the Hall element 136, which is located at the inner circumference side of the opening of the rolling corrective coil 123 when viewed from the radial direction. Therefore, it is possible to detect the angular position of the movable body 10 based on the output from the Hall element 136.

Further, in the present examples, the shake corrective-magnet drive structure 20 and the rolling corrective-magnet drive structure 23 are arranged in the circumferential direction around the Z axis. The first shake-correction magnet 61 of the first shake corrective-magnet drive structure 21, which constitutes the shake corrective-magnet drive structure 20, is polarized and magnetized in the direction of the Z axis, and includes one magnetic polarization line 61a that extends in the circumferential direction. Further, when viewed from the radial direction, the magnetic polarization line 61a of the first shake-correction magnet 61 overlaps with the opening of the first shake-correction coil 121. Similarly, the first shake-correction magnet 62 of the second shake corrective-magnet drive structure 22, which constitutes the shake corrective-magnet drive structure 20, is polarized and magnetized in the direction of the Z axis, and includes one magnetic polarization line 62a that extends in the circumferential direction. Further, when viewed from the radial direction, the magnetic polarization line 62a of the first shake-correction magnet 62 overlaps with the opening of the second shake-correction coil 122. According to such a configuration, the effective sides of the first shake-correction coil 121 and the second shake-correction coil 122 extend in the circumferential direction. Therefore, it is not necessary to enlarge the first shake-correction coil 121 and the second shake-correction coil 122 in the radial direction in order to ensure the driving force by the shake corrective-magnet drive structure 20. As a result, it is possible to prevent the fixed body 11 from becoming large in the direction of the Z axis.

Modified Examples of Rolling Corrective-Magnet Drive Structure

Figure 18:
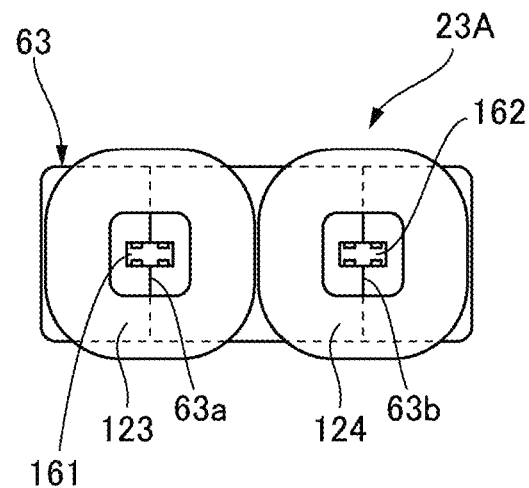
FIG. 18 is an explanatory diagram of a rolling corrective-magnet drive structure according to a first modified example; and Each of FIGS. 19A, 19B, and 19C is an explanatory view of a rolling corrective-magnet drive structure of each of second, third, and fourth modified examples.
Figure 19A:
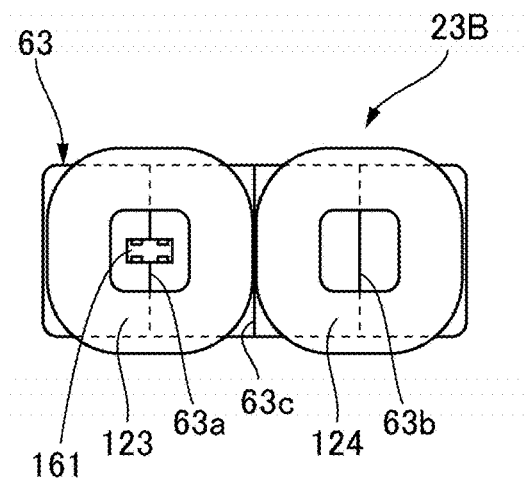
Figure 19B:
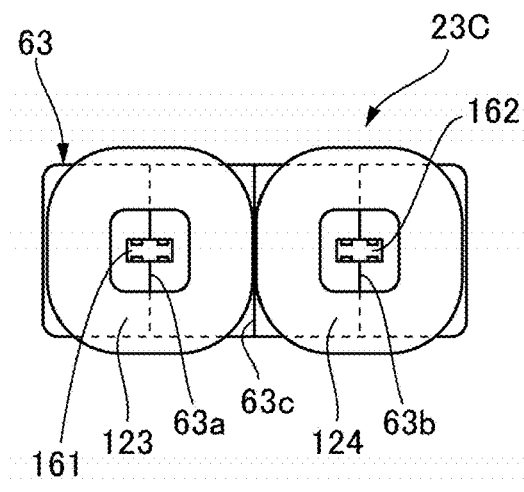
Figure 19C:
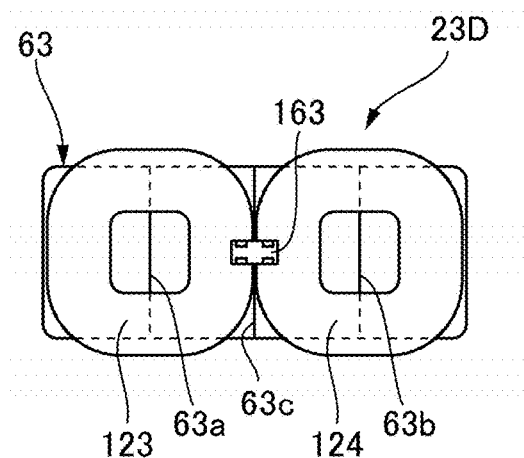

FIG. 18 is an explanatory diagram of a rolling corrective-magnet drive structure of a first modified example. FIG. 19A is an explanatory diagram of a rolling corrective-magnet drive structure of a second modified example. FIG. 19B is an explanatory diagram of a rolling corrective-magnet drive structure of a third modified example. FIG. 19C is an explanatory diagram of a rolling corrective-magnet drive structure of a fourth modified example. In each of FIGS. 18, 19A, 19B, and 19C, the holder to which the rolling corrective magnet 63 is fixed and the fourth frame plate portion 114 of the case 105 located between the rolling corrective magnet 63 and the two rolling corrective coils 123 and 124 are omitted.

In the rolling corrective-magnet drive structure 23A of the first modified example, as illustrated in FIG. 18, the rolling corrective magnet 63 is magnetized with three poles in the circumferential direction. The rotational position sensor 135 includes a first Hall element 161 for a rotational position sensor located in the inner circumference side of the opening of the rolling corrective coil 123 when viewed from the radial direction, and a second Hall element 162 for a rotational position sensor located in the inner circumference side of the opening of the other rolling corrective coil 124 when viewed from the radial direction. In this case, a positive output terminal of the first Hall element 161 for the rotational position sensor is connected to a negative output terminal of the second Hall element 162 for the rotational position sensor. Further, a negative output terminal of the first Hall element 161 for the rotational position sensor is connected to a positive output terminal of the second Hall element 162 for the rotational position sensor. Accordingly, the rotational position sensor 135 outputs a differential signal of a first output from the first Hall element 161 for the rotational position sensor and a second output from the second Hall element 162 for the rotational position sensor. According to this configuration, the rotational position sensor 135 can accurately detect the angular position of the movable body 10 on the basis of the differential signal.

As illustrated in FIG. 19A, in the rolling corrective-magnet drive structure 23B of the second modified example, the rolling corrective magnet 63 is magnetized with four poles in the circumferential direction. Therefore, the rolling corrective magnet 63 includes three magnetic polarization lines extending in parallel in the direction of the Z axis. The two magnetic polarization lines located on both sides in the circumferential direction are the first magnetic polarization line 63a and the second magnetic polarization line 63b, which overlap with the opening of the two rolling corrective coil 123, 124 when viewed from the radial direction. A third magnetic polarization line 63c is located in the center in the circumferential direction. In the present example, the rotational position sensor 135 includes the first Hall element 161 for the rotational position sensor located on the inner circumference side of the opening of the rolling corrective coil 123 when viewed from the radial direction. The rotational position sensor 135 detects the oscillation angle of the movable body 10 around the Y axis, based on the output from the first Hall element 161 for the rotational position sensor.

As illustrated in FIG. 19B, in the rolling corrective-magnet drive structure 23C of the third modified example, the rolling corrective magnet 63 is magnetized with four poles in the circumferential direction. Therefore, the rolling corrective magnet 63 includes the first magnetic polarization line 63a and the second magnetic polarization line 63b which overlap with the openings of the two rolling corrective coils 123, 124 when viewed from the radial direction, and the third magnetic polarization line 63c which is located in the center in the circumferential direction. In the present example, the rotational position sensor 135 includes the first Hall element 161 for the rotational position sensor located in the inner circumference side of the opening of the rolling corrective coil 123 when viewed from the radial direction, and the second Hall element 162 for the rotational position sensor located in the inner circumference side of the opening of the other rolling corrective coil 124 when viewed from the radial direction. In this case, the positive output terminal of the first Hall element 161 for the rotational position sensor is connected to the positive output terminal of the second Hall element 162 for the rotational position sensor. Further, a negative output terminal of the first Hall element 161 for the rotational position sensor is connected to a negative output terminal of the second Hall element 162 for the rotational position sensor. Accordingly, the rotational position sensor 135 outputs an addition signal, which is obtained by adding the first output from the first Hall element 161 for the rotational position sensor with the second output from the second Hall element 162 for the rotational position sensor. According to this configuration, the rotational position sensor 135 can accurately detect the angular position of the movable body 10 based on the addition signal.

As illustrated in FIG. 19C, in the rolling corrective-magnet drive structure 23D of the fourth modified example, the rolling corrective magnet 63 is magnetized with four poles in the circumferential direction. Therefore, the rolling corrective magnet 63 includes the first magnetic polarization line 63a and the second magnetic polarization line 63b which overlap with the openings of the two rolling corrective coils 123, 124 when viewed from the radial direction, and the third magnetic polarization line 63c that is located in the center in the circumferential direction. In the present example, the rotational position sensor 135 includes a Hall element 163 for a rotational position sensor located between the two rolling corrective coils 123 and 124 in the circumferential direction. The rotational position sensor 135 detects the oscillation angle of the movable body 10 around the Y axis, based on the output from the Hall element 163 for the rotational position sensor.

Modified Examples

The magnetic component may include a second magnet fixed to the plate roller 66 instead of the magnetic components 91 to 94.

Note that, although the magnets and the magnetic components of the pressurization structure 69 are provided at four locations around the Z axis, these may be provided at two locations on both sides of the optical axis L interposed therebetween.

Further, the shake corrective-magnet drive structure 20 may include the first magnet 56 and the second magnet 57 which are fixed to the fixed body 11, and the first shake-correction coil 121 and the second shake-correction coil 122 which are fixed to the movable body 10. Similarly, the rolling corrective-magnet drive structure 23 may include the rolling corrective magnet 63 fixed to the movable body 10 and two rolling corrective coils 123 and 124 fixed to the fixed body 11.

Further, the first annular groove 45 may be formed on the holder end plate portion 33 of the holder 25. Further, the second annular groove 65 may be formed on the annular plate portion 75 of the plate roller main body 73.

What is claimed is:

1. An optical unit with shake-correction function, comprising:
   a movable body comprising a camera module;
   a rotational support structure, configured to rotatably support the movable body around an optical axis of a lens of the camera module;
   a gimbal mechanism, configured to rotatably support the rotational support structure around a first axis intersecting with the optical axis and around a second axis intersecting the optical axis and the first axis;
   a fixed body, configured to support the movable body through the gimbal mechanism and the rotational support structure; and
   a rolling corrective-magnet drive structure, configured to rotate the movable body around the optical axis,
   wherein the rolling corrective-magnet drive structure comprises:
      a rolling corrective magnet, being fixed to one of the movable body and the fixed body; and
      two rolling corrective coils, being fixed to the other of the movable body and the fixed body,
   wherein the rolling corrective magnet is configured to be polarized and magnetized in a circumferential direction and includes a first magnetic polarization line and a second magnetic polarization line which extend in parallel in a direction of the optical axis,
   wherein the two rolling corrective coils are arranged in a circumferential direction around the optical axis, and
   wherein, when viewed from a radial direction centered on the optical axis, the first magnetic polarization line overlaps with an opening of one of the rolling corrective coils, and the second magnetic polarization line overlaps with an opening of the other of the rolling corrective coils.

2. The optical unit with shake-correction function according to claim 1,
   wherein the movable body comprises a holder including a frame portion to surround the camera module from an outer circumference side centered on the optical axis,
   wherein the fixed body comprises a case to surround the frame portion from an outer circumference side,
   wherein the rolling corrective magnet is fixed to the frame portion, and
   wherein the two rolling corrective coils are fixed to the case on a side opposite to the rolling corrective magnet.

3. The optical unit with shake-correction function according to claim 2,
   wherein the holder is made of magnetic metal, and
   wherein the case is made of non-magnetic metal.

4. The optical unit with shake-correction function according to claim 1,
   wherein the rotational support structure comprises:
      a first annular groove, being provided on the movable body in a state of being coaxial with the optical axis;
      a plate roller, comprising a second annular groove to face the first annular groove in the direction of the optical axis;
      a plurality of spherical objects, being inserted into the first annular groove and the second annular groove to roll between the movable body and the plate roller; and
      a pressurization structure, configured to apply a force to bring the first annular groove and the second annular groove closer to each other in the direction of the optical axis,
   wherein the gimbal mechanism is configured to rotatably support the plate roller around the first axis,
   wherein the plate roller is non-magnetic, and
   wherein the pressurization structure comprises:
      a magnet component, being fixed to a portion of the plate roller in the circumferential direction around the optical axis; and
      a magnet, configured to be fixed to a portion of the movable body in the circumferential direction and attract the magnetic component.

5. The optical unit with shake-correction function of claim 1, further comprising:
   a position sensor, configured to detect an angular position of the movable body around the optical axis,
   wherein the position sensor comprises a first Hall element located in an inner circumference side of an opening in one of the rolling corrective coils when viewed from the radial direction.

6. The optical unit with shake-correction function according to claim 5,
   wherein the position sensor comprises a second Hall element located in an inner circumference side of an opening of the other of the rolling corrective coils when viewed from the radial direction.

7. The optical unit with shake-correction function according to claim 6,
   wherein the rolling corrective magnet is configured to be magnetized with three poles in the circumferential direction, and
   wherein the position sensor is configured to output a differential signal of a first output from the first Hall element and a second output from the second Hall element.

8. The optical unit with shake-correction function according to claim 6,
   wherein the rolling corrective magnet is configured to be magnetized with four poles in the circumferential direction, and comprises three magnetic polarization lines to extend in parallel in the direction of the optical axis,
   wherein two of the three magnetic polarization lines located on both sides in the circumferential direction are the first magnetic polarization line and the second magnetic polarization line, respectively, and
   wherein the position sensor is configured to output an addition signal of a first output from the first Hall element and a second output from the second Hall element.

9. The optical unit with shake-correction function according to claim 1, further comprising:
a position sensor, configured to detect an angular position of the movable body around the optical axis,
wherein the rolling corrective magnet is configured to be magnetized with four poles in the circumferential direction, and comprises three magnetic polarization lines to extend in parallel in the direction of the optical axis,
wherein two of the three magnetic polarization lines located on both sides in the circumferential direction are the first magnetic polarization line and the second magnetic polarization line, respectively, and
wherein the position sensor comprises a Hall element disposed at a position overlapping with a third magnetic polarization line located between the first magnetic polarization line and the second magnetic polarization line in the circumferential direction when viewed from the radial direction.

10. The optical unit with shake-correction function according to claim 1, further comprising:
a shake corrective-magnet drive structure, configured to rotate the movable body around the first axis and the second axis,
wherein the shake corrective-magnet drive structure and the rolling corrective-magnet drive structure are arranged in the circumferential direction around the optical axis,
wherein the shake corrective-magnet drive structure comprises:
a shake-correction magnet, being fixed to one of the movable body and the fixed body; and
a shake-correction coil, being fixed to the other of the movable body and the fixed body,
wherein the shake-correction magnet is configured to be polarized and magnetized in the direction of the optical axis, and comprises one magnetic polarization line to extend in a circumferential direction, and
wherein, when viewed from the radial direction, the magnetic polarization line of the shake-correction magnet overlaps with an opening of the shake-correction coil.

* * * * *